United States Patent
Di Cairano et al.

(10) Patent No.: US 10,281,897 B2
(45) Date of Patent: May 7, 2019

(54) MODEL PREDICTIVE CONTROL WITH UNCERTAINTIES

(71) Applicant: Mitsubishi Electric Research Laboratories, Inc., Cambridge, MA (US)

(72) Inventors: Stefano Di Cairano, Somerville, MA (US); Claus Danielson, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 796 days.

(21) Appl. No.: 14/727,970

(22) Filed: Jun. 2, 2015

(65) Prior Publication Data

US 2016/0357169 A1  Dec. 8, 2016

(51) Int. Cl.
G05B 19/10 (2006.01)
G05B 13/04 (2006.01)

(52) U.S. Cl.
CPC ......... G05B 19/106 (2013.01); G05B 13/048 (2013.01); G05B 2219/23456 (2013.01)

(58) Field of Classification Search
CPC ............................ G05B 19/106; G05B 13/048
USPC .......................................................... 700/29
See application file for complete search history.

(56) References Cited

U.S. PATENT DOCUMENTS

| | | | |
|---|---|---|---|
| 5,659,667 A | 8/1997 | Buescher et al. | |
| 6,826,521 B1 | 11/2004 | Hess et al. | |
| 7,317,953 B2 | 1/2008 | Wojsznis et al. | |
| 7,376,472 B2 * | 5/2008 | Wojsznis ............... | G05B 11/32 700/28 |
| 7,599,751 B2 | 10/2009 | Cutler | |
| 8,032,236 B2 | 10/2011 | Stephenson et al. | |
| 8,126,575 B2 | 2/2012 | Attarwala | |
| 8,273,052 B2 | 9/2012 | Damiano et al. | |
| 9,400,491 B2 * | 7/2016 | Kolinsky ............... | G05B 13/04 |
| 2005/0149209 A1 | 7/2005 | Wojsznis et al. | |
| 2007/0055392 A1 | 3/2007 | D'amato et al. | |

(Continued)

FOREIGN PATENT DOCUMENTS

| | | |
|---|---|---|
| JP | 07191709 | 7/1993 |
| JP | 2011198327 | 10/2011 |

(Continued)

OTHER PUBLICATIONS

L. Hetel, J. Daafouz, and C. Iung, Stabilization of Arbitrary Switched Linear Systems with Unknown Time-Varying Delays, Oct. 2006, IEEE Transactions on Automatic Control, vol. 51, No. 10, pp. 1668-1674.*

(Continued)

*Primary Examiner* — Robert E Fennema
*Assistant Examiner* — Christopher W Carter
(74) *Attorney, Agent, or Firm* — Gennadiy Vinokur; James McAleenan; Hironori Tsukamoto

(57) ABSTRACT

An operation of the machine is iteratively controlled with control inputs determined from an optimization of a cost function along a prediction horizon subject to constraints on the control inputs. The optimization is performed according to the model and the cost function includes at least one parameter of the model. During at least some iterations of the control, the parameter of the model is updated resulting in updating the cost function.

16 Claims, 17 Drawing Sheets

(56) References Cited

U.S. PATENT DOCUMENTS

| | | | |
|---|---|---|---|
| 2011/0022193 A1 | 1/2011 | Panaitescu | |
| 2011/0106049 A1 | 5/2011 | Damiano et al. | |
| 2012/0023061 A1 | 1/2012 | Stephenson et al. | |
| 2014/0343695 A1 | 11/2014 | Di Cairano et al. | |

FOREIGN PATENT DOCUMENTS

| | | |
|---|---|---|
| WO | 20061021125 | 3/2006 |
| WO | 2007024847 | 3/2007 |
| WO | 2011014350 | 2/2011 |

OTHER PUBLICATIONS

Jamal Daafouz, Pierre Riedinger, and Cluade lung, Stability and Control Synthesis for Switched Systems: A Switched Lyapunov Function Approach, Nov. 2002, IEEE Transactions on Automatic Control, vol. 47, No. 11, pp. 1883-1887.*

Frank Allgower, Alex Zheng, Progress in systems and contorl theory: Nonlinear Model Predictive Control, 2000, Birkhauser, vol. 26, pp. 5 and 6.*

Dr. Alexander Weinmann, Uncertain Models and Robust Control, 1991, Springer-Verlag Wien, Chapter 1.*

Adetola et al. "Adaptive Model Predictive Control for Constrained Nonlinear Systems," System and Control Letters, North Holland Publishing, Amsterdam, NL. vol. 58, No. 5. Jan. 21, 2009. pp. 320-326.

Dafouz et al. "Parameter Dependent Lyapunov Functions for Discrete Time Systems with Time Varying Parametric Uncertainties," Systems and Controls Letters, vol. 43, No. 5. Aug. 15, 2001, pp. 355-359.

Weiss et al. Robust Dual Control MPC with Guaranteed Constraint Satisfaction, 53rd IEEE Conference on Decision and Control, IEEE. Dec. 15, 2014. pp. 6713-6718.

Braun et al. "Predictive Control Algorithms: Stability Despite Shortened Optimization Horizons," Proceedings of the 15th IFAC Workshop on Control Applications of Optimization, Sep. 12, 2012. pp. 274-279.

Shouche et al: Simultaneous Constrained Model Predictive Control and Identification of DARX Processes, Automatica, vol. 34, No. 12. Dec. 31, 1998. pp. 1521-1530.

Marafioti et al. "Persistently Exciting Model Predictive Control," International Journal of Adaptive Control and Signalprocessing, vol. 28, No. 6. May 10, 2013. pp. 536-552.

Adetola et al., "Adaptive Model Predictive Control for Constrained Nonlinear Systems." Systems and Control Letters, 2009, vol. 58, No. 5, pp. 320-326.

* cited by examiner

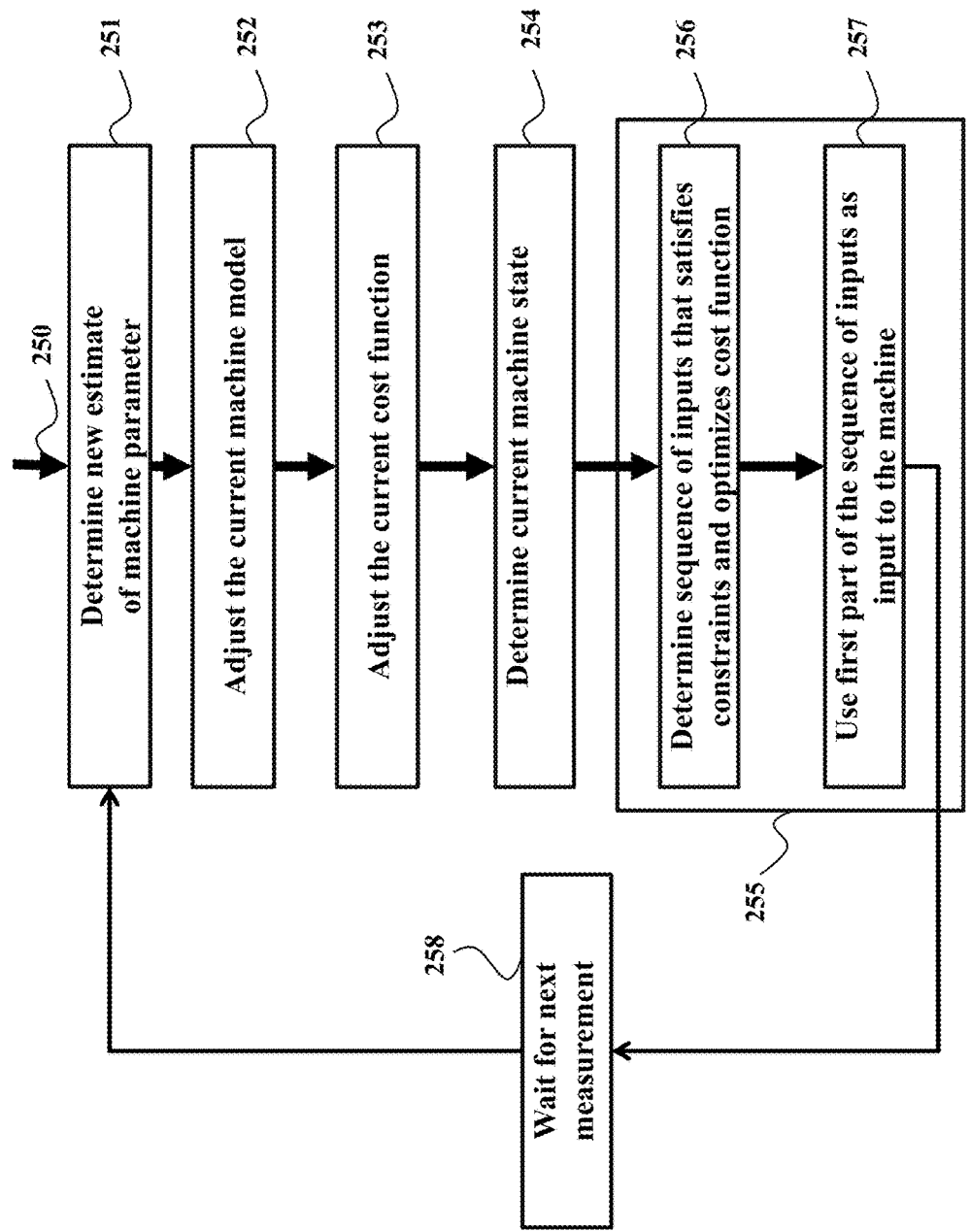

MODEL PREDICTIVE CONTROL WITH UNCERTAINTIES

FIELD OF THE INVENTION

This invention relates generally to controlling an operation of a machine, and more particularly to controlling the operation using a model predictive control (MPC) over a receding horizon.

BACKGROUND OF THE INVENTION

In machine control, a controller, which can be implemented using one or combination of software or hardware, generates commands values for input to a machine based on measurements obtained, e.g., from sensors and/or estimators, from outputs of the machine. The controller selects the input so that the machine operates as desired, for instance, the operation follows a desired reference profile, or regulates the outputs to a specific value. In several cases, the controller enforces constraints on the inputs and outputs of the machine, for instance ensuring that the corresponding variables are in some predetermined ranges to ensure safe machine operation from a physical specification. In order to enforce such constraints, the controller often uses a model of the machine to predict what behavior the machine produces when a command, i.e., a control input, is applied. One example of a controller that is capable of achieving control of a machine while enforcing constraints on the machine inputs and outputs is model predictive control (MPC).

The MPC is based on an iterative, finite horizon optimization of a model of a machine and has the ability to anticipate future events to take appropriate control actions. This is achieved by optimizing the operation of the machine over a future finite time-horizon subject to constraints, and only implementing the control over the current timeslot. For example, the constraints can represent physical limitation of the machine, safety limitations on the operation of the machine, and performance limitations on a trajectory. A control strategy for the machine is admissible when the motion generated by the machine for such a control strategy satisfies all the constraints. For example, at time t, the current state of the machine is sampled and an admissible cost minimizing control strategy is determined for a relatively short time horizon in the future. Specifically, an online or real-time calculation determines a cost-minimizing control strategy until time t+T. After the step of the control is implemented, the state is sampled again and the calculations are repeated starting from the now current state, yielding a new control and new predicted state path. The prediction horizon shifts forward, and for this reason MPC is also called receding horizon control.

The MPC can be used to generate the actual trajectory of the motion of the machine based on a model of the system and the desired reference trajectory by solving an optimal control problem over a finite future time subject to various physical and specification constraints of the system. The MPC aims at minimizing performance indices of the motion of the machine, such as an error between a reference and an actual motion of the machine, the machine energy consumption, and induced system vibration.

Because the MPC is a model-based framework, the performance of the MPC inevitably depends on the quality of the prediction model used in the optimal control computation. However, in most cases, the model for the machine dynamics is unknown a priori, as some parameters are not measured precisely. Thus, the controller may need to estimate unknown parameters of the model of the machine, concurrently to the operation of the machine, and thus, also enforce constraints while the parameters are estimated. The conventional approaches to handle such problems include adaptive or learning-based MPC, where an MPC control problem is augmented with a closed-loop identification scheme in order to learn the unknown machine parameters. By learning the unknown parameters, the operation of the machine achieved by the controller is improved.

However, current approaches of adaptive and learning based MPC are limited for multiple reasons. First, while estimating the unknown parameters, constraints can be violated or the control performance may be excessively reduced in order to conservatively enforce the constraints. In fact, several existing methods, such as a method described in U.S. 2011/0022193, simply ignore the constraints and thus are incapable of producing admissible control strategies for machines subject to constraints.

Second, simply adjusting the prediction model of the MPC based on the identified model of the machine it is not enough to guarantee that the output of the machine achieves the desired value. Accordingly, there is a need for a method for controlling an operation of a machine using the MPC that includes uncertainty, wherein the operation of the machine is subject to the constraints.

Since the MPC behavior depends on the prediction model and the performance index, when the first is updated, the second needs to be adjusted also to achieve convergence of the machine output to the desired value. This may also require specific designs of certain additional constraints of the MPC problem. Also, adjusting the cost function needs to be computationally simply.

Third, it is desired that a certain proportionality exists between the parameter estimation error, and the error in the controlling of the machine, so that small estimation error causes only small controlling error.

Finally, several methods for adaptive MPC require a significant amount of computation and can be executed only in expensive processors at a slow rate, enabling only machines with low response bandwidth to be controlled.

Accordingly, there is a need for a method for controlling an operation of a machine using the MPC that includes uncertainty, wherein the operation of the machine is subject to the constraints, and the control error is proportional to the parameter estimation error and convergence is achieved when the estimation error vanishes.

SUMMARY OF THE INVENTION

It is an object of some embodiments of an invention to provide a method for controlling an operation of a machine using a model predictive control (MPC) that includes uncertainty, wherein the operation of the machine is subject to the constraints.

It is another object of one embodiment to update the model of the machine and a cost function used by the MPC. This embodiment is based on recognition that the MPC depends on the model used to predict the operation of the machine along a prediction horizon and also depends on the cost function specifying the performance of the operation of the machine. Therefore, when the model of the machine is updated, the cost function also needs to be updated to achieve the convergence of the movement of the machine into a desired state. It is an object of a different embodiment to reduce the computational complexity required to update the cost function.

It is an object of a different embodiment of the invention to enable proportionality between the parameter estimation error and the error in the controlling of the machine, so that, for example, a small estimation error causes only a small controlling error. It is an object of another embodiment of the invention to provide additional constraints of the MPC to ensure satisfaction of all constraints during the control and the update of the MPC, such that to enforce the constraints at all time and to have the state of the machine to eventually achieve a target value.

Some embodiments of the invention are based on realization that the cost function can be defined to include a parameter of the model having an uncertainty. In such a manner, when the parameter of the model is updated, such an update results in updating the cost function as well.

Some embodiments are based on another realization that it is possible to enforce constraints on a collection of models defined based on an admissible range for the uncertain values of the machine parameters and the additional constraints designed based on the adjustable cost function. The collection of models provides a set of feasible states and inputs for the machine. For example, a special subset of these feasible states can be designed such that for all states in this subset, there is a feasible control input that maintains the states in that subset for all values of the unknown machine parameters within their known ranges. This guarantees that the system controlled by the MPC satisfies the constraints even when the parameters of the model are uncertain.

Some embodiments of this invention are based on the realization that the proportionality between the estimation error and the control error and the convergence of the machine to the desired value are achieved if the machine parameters in the prediction model of the MPC are adjusted with a delay equal to the MPC prediction horizon, with respect to the time instant in which they are obtained from the estimation module.

Accordingly, one embodiment of the invention discloses a method for controlling an operation of a machine according to a model of the machine. The method includes controlling iteratively the operation of the machine with control inputs determined from an optimization of a cost function along a prediction horizon subject to constraints on the control inputs, wherein the optimization is according to the model, wherein the cost function includes at least one parameter of the model; and updating the parameter of the model resulting in updating the cost function for at least some iterations of the controlling, wherein steps of the method are performed using a processor, and wherein the controlling changes a state of the machine.

Another embodiment discloses a system for controlling an operation of a machine according to a model of the machine including a sensor for determining a state of the machine; a processor for updating a value of at least one parameter of the model using the state of the machine, such that the update value of the parameter satisfies a constraint on admissible values of the parameter; and a controller for controlling iteratively the operation of the machine with control inputs determined from an optimization of a cost function along a prediction horizon subject to constraints on the control inputs using the model for prediction along the prediction horizon, wherein the cost function includes at least one parameter of the model, such that the updated value of the parameter updates the model and the cost function.

BRIEF DESCRIPTION OF THE DRAWINGS

FIG. 2F is a flow chart of the method executed by the modules of the controller according to one embodiment of the invention;

DETAILED DESCRIPTION OF THE PREFERRED EMBODIMENT

Figure 1A:
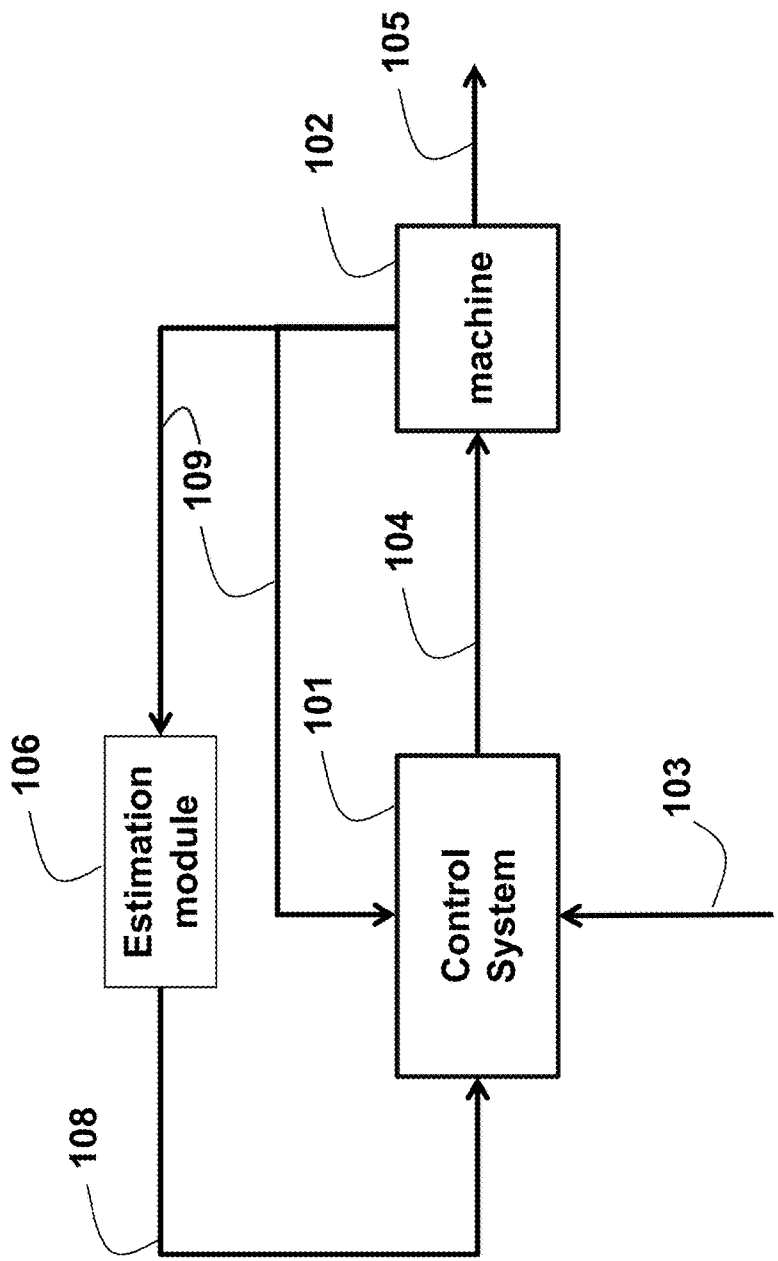
FIG. 1A is a block diagram of a controller for controlling an operation of a machine according to one embodiment of the invention.

FIG. 1A shows a block diagram of a control system 101 for controlling an operation of a machine 102. The machine 102 is a device whose operation changes values of physical quantities such as positions, velocities, currents, and temperatures in response to commands. As used herein, the operation of the machine determines a motion of the machine that changes such quantities. The control system receives a desired motion 103 for the machine, such as a desired trajectory or target point for some of the quantities, and controls the machine via control inputs 104. The control inputs can include commands to change parameters of the operation of the machine or can include actual values of the parameters such as voltages, pressures, torques, forces that affect the machine motion resulting in the generation of output quantities 105 for the machine that are desired to match the desired motion 103. In some embodiments of the invention, the machine includes at least one parameter of uncertainty. For example, a model of an arm of a robot moving an object can include an uncertainty about a mass of the object carried by the arm. A model for the movement of a train can include an uncertainty about a friction of the wheels with the rails in current weather conditions.

The control system 101 receives information 109 about the machine motion, from sensors, hardware, or software connected directly or remotely to the machine. The information 109 includes a state of the machine. The control system also receives the information about current estimates 108 of uncertain machine parameters from an estimation module 106. The control system 101 uses the state and the parameter estimates for the selection of the control inputs 104 which determine the motion of the machine and the output of the machine 105. The quantities 105, the control inputs 104 or a combination thereof, can be requested to remain in some pre-defined ranges according to constraints on the operation of the machine.

Figure 1B:
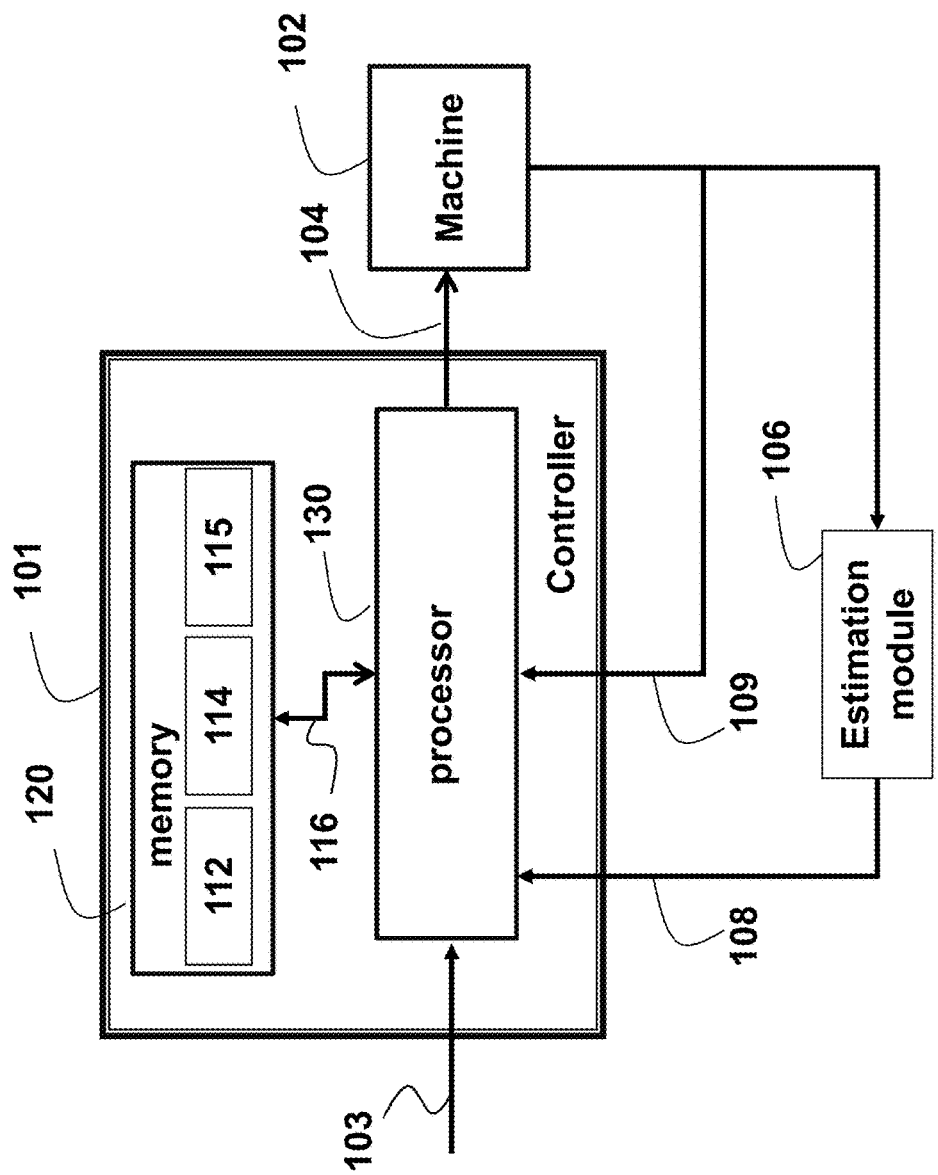
FIG. 1B is a block diagram of a general structure of the controller of FIG. 1A according to one embodiment of the invention.

FIG. 1B shows a general structure of the control system 101 according one embodiment of the invention. The control system 101 includes at least one processor 130 for executing modules of the controller. The processor 130 is operatively connected to a memory 120 for storing the model 112, the cost function 115 and the constraints 114 of the machine 101. It is an objective of some embodiments of the invention to determine the control inputs 104 using an adjustable cost function 115 and a model of the machine with uncertainty 112 subject to the constraints 114. In some embodiments, the model of the machine and the adjustable cost function are updated 116 based on current parameter estimates 108 during the operation of the machine. Alternatively, some embodiments update the model when the machine is not operating.

Some embodiments of the invention are based on recognition that when the model 112 of the machine is updated, the cost function 115 also needs to be updated to achieve the convergence of the movement of the machine into a desired state. However such an update is generally computationally expensive. For example, such an update can require advanced numerical method running on powerful processors with large amounts of memory to find the solution of linear matrix inequalities or Riccati equations.

Figure 1C:
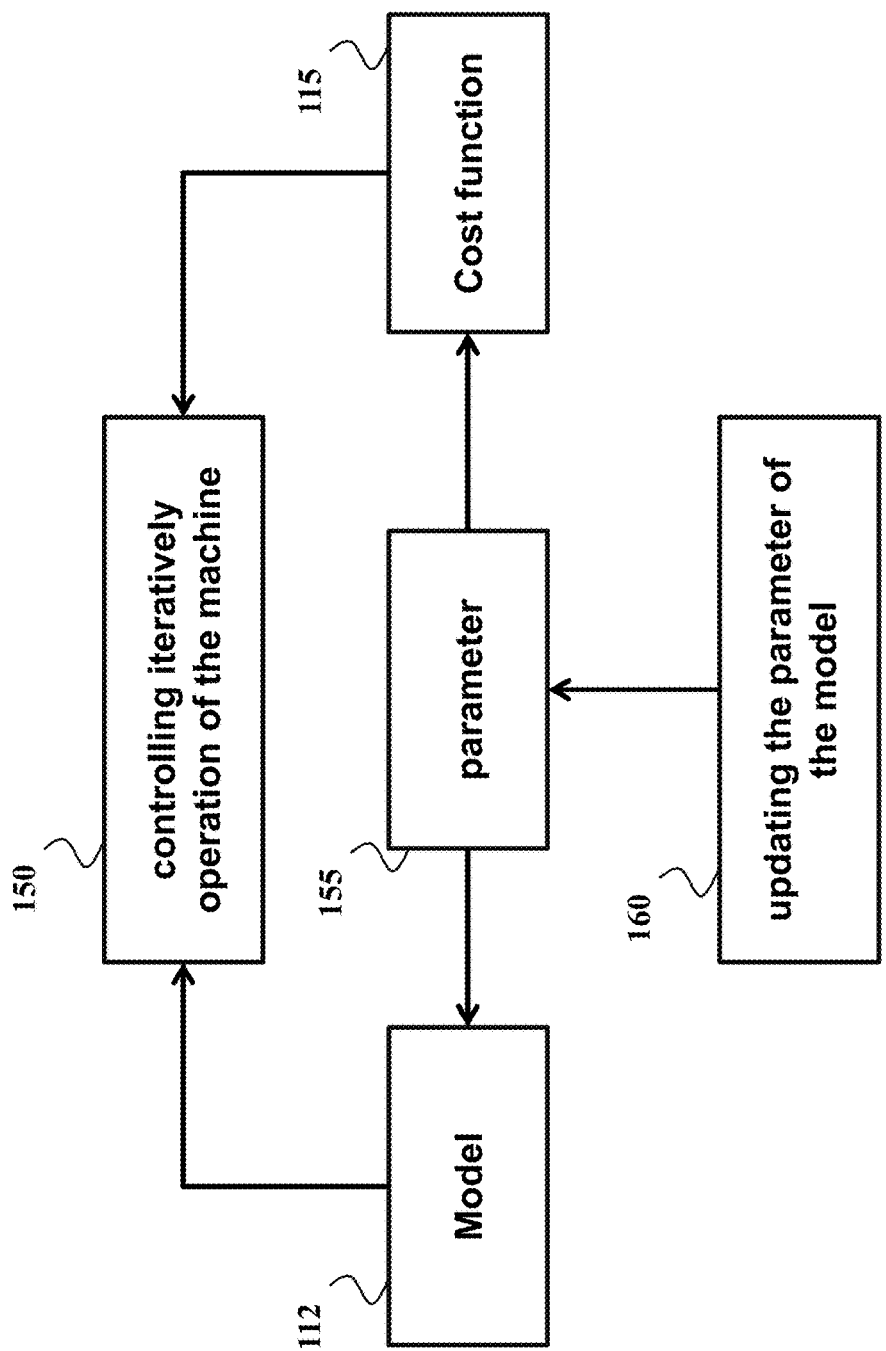
FIG. 1C is a block diagram of a method for controlling the operation of a machine according to one embodiment of the invention.

FIG. 1C shows a block diagram of a method for controlling the operation of a machine according to one embodiment of the invention. The embodiment is based on realization that the cost function can be defined to include a parameter of the model having an uncertainty. In such a manner, when the parameter of the model is updated, such an update results in updating the cost function as well, which simplify the computational requirement for updating the cost function. The steps of the method can be performed by a processor such as the processor 130.

The method iteratively controls 150 the operation of the machine with control inputs determined from an optimization of the cost function 115 along a prediction horizon subject to constraints on the control inputs. The optimization is performed using the model 112 according to the principles of the MPC.

In this embodiment, the cost function 112 includes at least one parameter 155 of the model 112. The embodiment updates 160 the parameter 155 for at least some iterations of the controlling. In such a manner the update 160 result in updating both the model 112 and the cost function 115.

Figure 2A:
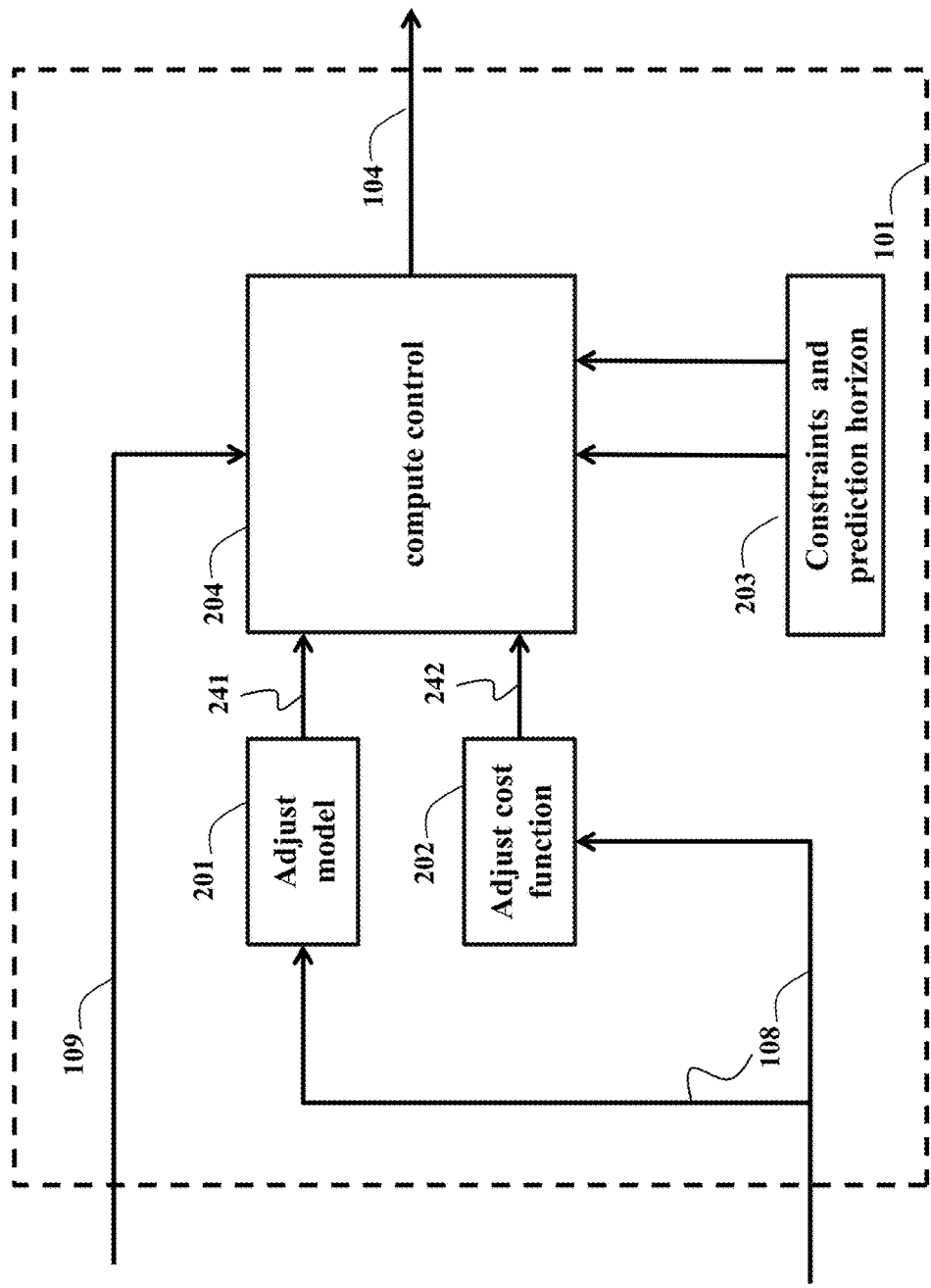
FIG. 2A is a block diagram of the controller modules according to one embodiment of the invention.
Figure 2B:
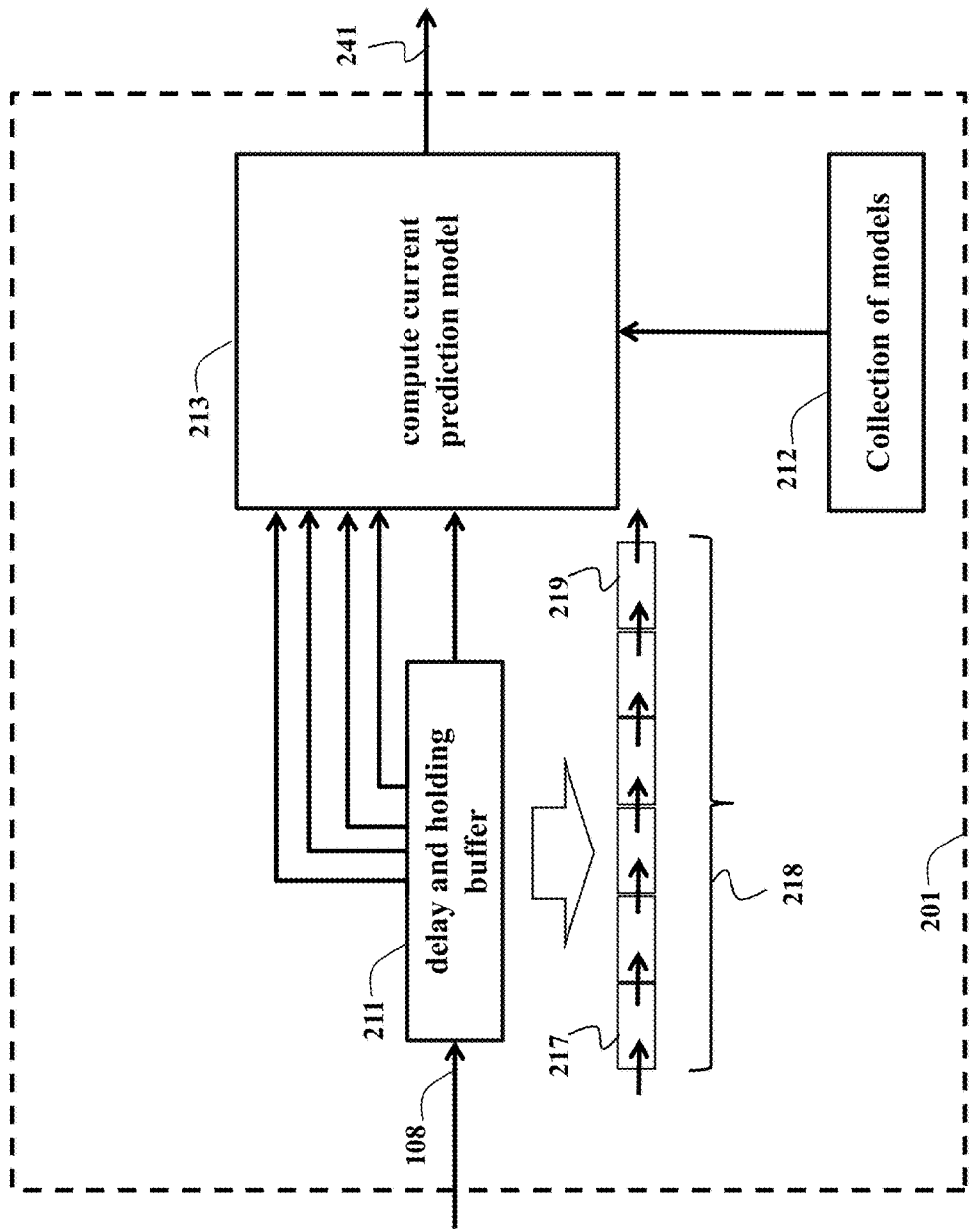
FIG. 2B is a block diagram of the module of the controller that constructs the prediction model according to one embodiment of the invention.

FIG. 2A shows a block diagram of different modules of the control system 101 according to one embodiment of the invention. A model adjustment module 210 updates at least one parameter of the model 112 having the uncertainty based on current parameter estimates 108. Similarly, a cost function adjustment module 202 updates the cost function 115 to guarantee stability and convergence of the MPC. The outputs from a constraints and prediction horizon module 203 are used with the updated model 241 outputted by the module 201, the updated cost function 242 outputted by the module 202 and the machine state 109 to determine 204 the control input 104 to the machine FIG. 2B shows a block diagram of the model adjustment module 201. The current estimate of the parameters 108 is placed into a delay buffer 211 with length 218 equals to the length of the MPC prediction horizon and the oldest value 219 currently within the delay buffer is removed. The model of the machine with uncertainty is represented as a collection of models 212. The values of the current and past estimates of the parameters of the model stored in the buffer are used together with the collection of models to construct 213 the current MPC prediction model 241.

According to some embodiments of the invention, the uncertainties of the parameters of the model are bounded. Those bounds on the uncertainties define ranges of admissible values of the parameters of the model, as explained in more details below. The admissible values form a collection of models, and some embodiments determine 213 the parameters of the model as a convex combination of the collection of the models.

Thus, the collection of models is obtained as those models that represent all possible values of the uncertainties. For instance the collection of models can be obtained by considering the minimal and maximal value for the uncertain parameters and obtaining the models corresponding to all the admissible combinations of minimal and maximal parameters. A model for the machine with parameters within the range of the uncertain parameters can then be obtained.

For example, each estimate of the parameter can be used together with the collection of models to obtain a model for the system valid at a specific time instant. Hence, by combining each value of the parameter estimates in the delay buffer with the collection of models, a sequence of models for the machine, where the sequence has length equal to that of the delay buffer, is obtained.

In one embodiment of the invention, when new value of the parameter of the model is determined, the entire set of control inputs is determined using the model with updated parameter. This embodiment is simpler to implement and take advantage of the more accurate value of the parameter. However, alternative embodiments are based on recognition that such an update of the entire sequence of control inputs provides discontinuity with the sequence of control inputs previously determined with the old value of the parameter of the model.

To that end, when the parameters of the model are updated, instead of predetermining the entire set of parameters in the buffer, some embodiments only remove the oldest 219 estimate of the parameters and add the new 218 estimate of the parameters. For instance considering an abstract representation of the buffer 211 in terms of sequential memory cells, when a new estimate is to be inserted, the parameter estimates currently in the buffer are copied to the memory cell to the right, when one exists. Thus, the oldest estimate placed on the rightmost cell 219 is overwritten, and hence disappears. The new estimate is placed on the leftmost memory cell 217, thus entering the buffer.

This abstract representation of the buffer 211 in terms of sequential memory cells can correspond to different physical representation of memory cell in the memory 120 of the controller 101. Such an update leads to the situation when the buffer 211 stores different values of the parameters and thus the model 112 used for prediction is time varying along the steps of the prediction horizon, even if the uncertain parameter has a constant fixed value. However, this makes possible to update only a single component of the cost function by using only simple computations and still obtain stability.

For example, the prediction horizon includes a sequence of prediction instants, such that the optimization produces control input for each prediction instant forming a sequence of control inputs for the prediction horizon. According to some embodiments, the model for determining the sequence of the control inputs changes between at least some prediction instants.

For example, one embodiment determines, for each prediction instant, a prediction model using the parameter determined a number of time instants before the prediction instant to produce a sequence of prediction models for the prediction horizon and jointly determines the sequence of control inputs using the sequence of prediction models.

In addition, some embodiments are based on realization that the proportionality between the estimation error and the control error and the convergence of the machine to the desired value are achieved if the machine parameters in the prediction model of the MPC are adjusted with a delay equal to the MPC prediction horizon, with respect to the time instant in which they are obtained from the estimation module. To that end, in one embodiment, the number of time instants is defined by a length of the prediction horizon.

Figure 2C:
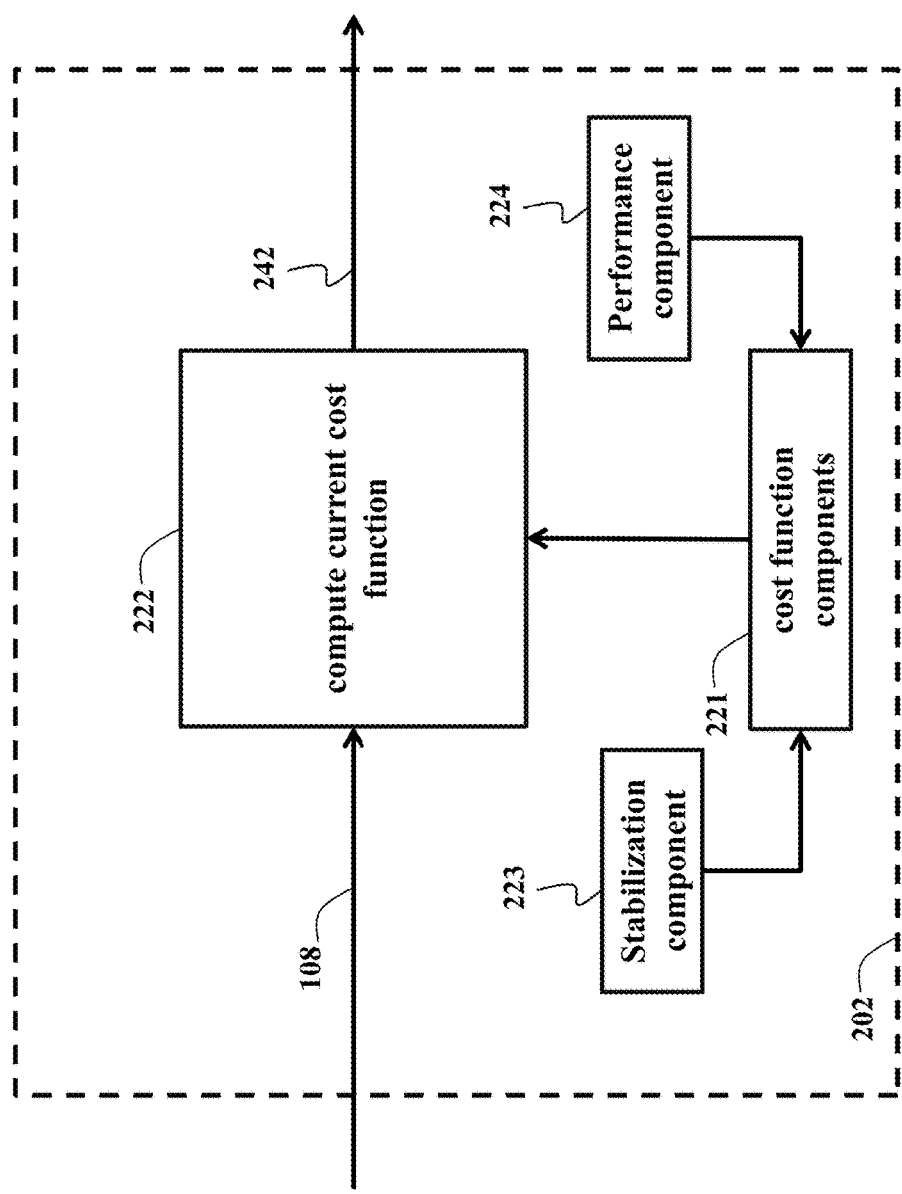
FIG. 2C is a block diagram of the module of the controller that adjusts the cost function according to one embodiment of the invention.

FIG. 2C shows a block diagram of a cost function adjustment module 202 according to one embodiment. The current cost function is computed 222 from the current parameter estimate 108 and a cost function components 221 representing the adjustable cost function 115. For example, in some implementations of this embodiment, the cost function includes a stabilization component 223 for directing a movement of the machine to a target state and a performance component 224 for optimizing the movement of the machine until the target state. In those implementations, the parameter 155 of the model includes a function of the stabilization component. For example, the stabilization component can include a sum of stabilization matrices weighted by an estimate of parameters of the model. For example, in addition to determining the stabilization matrices, one or more stabilizing gains can also be determined.

Figure 2D:
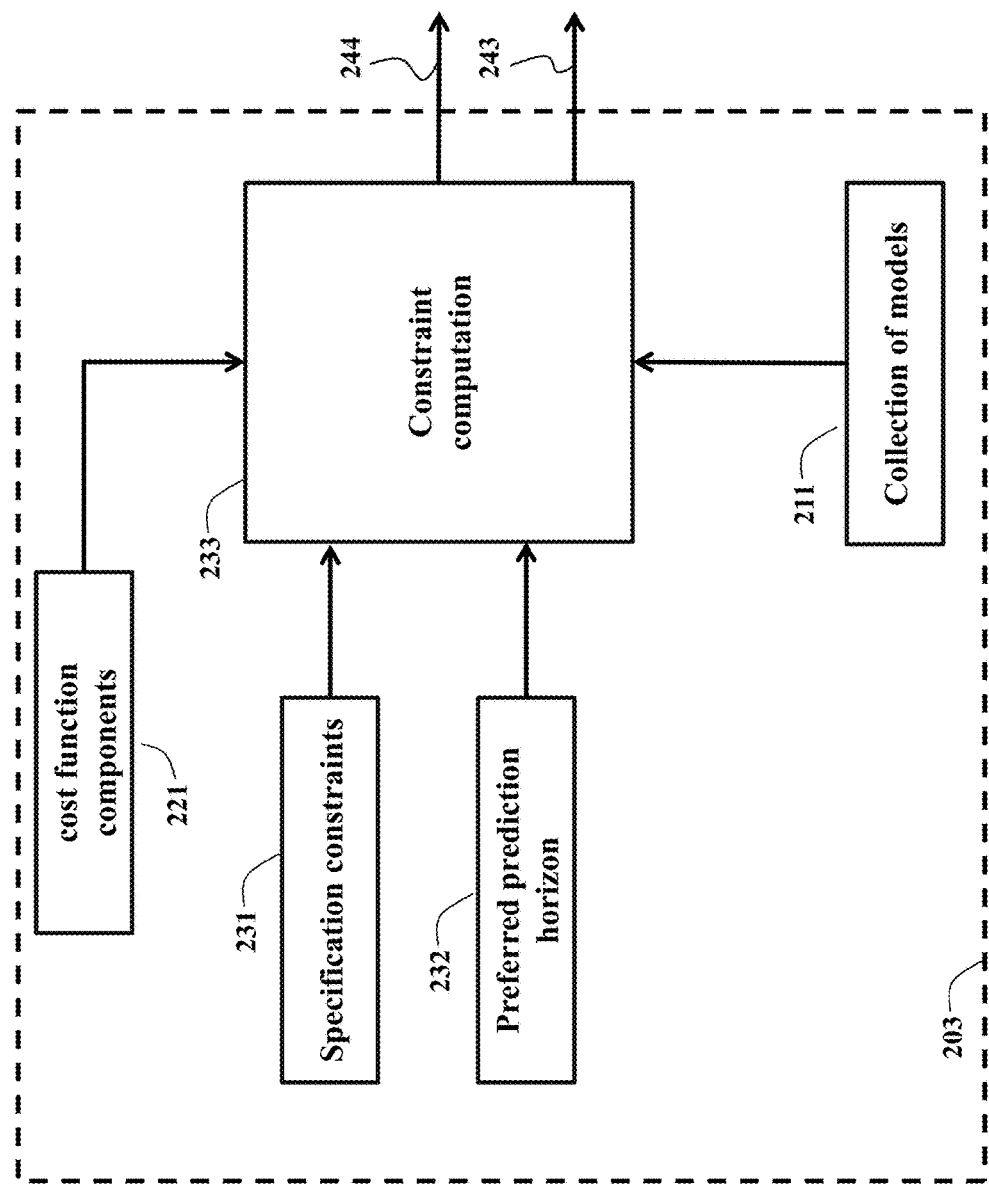
FIG. 2D is a block diagram of the module of the controller that constructs the constraints according to one embodiment of the invention.

FIG. 2D shows the details of the computation of the constraints and prediction horizon of MPC. From the specification constraints 231 the ensemble of cost function components, the preferred prediction horizon 232 and the ensemble of models a set of MPC constraints and actual prediction horizon for the MPC model are computed 233.

Figure 2E:
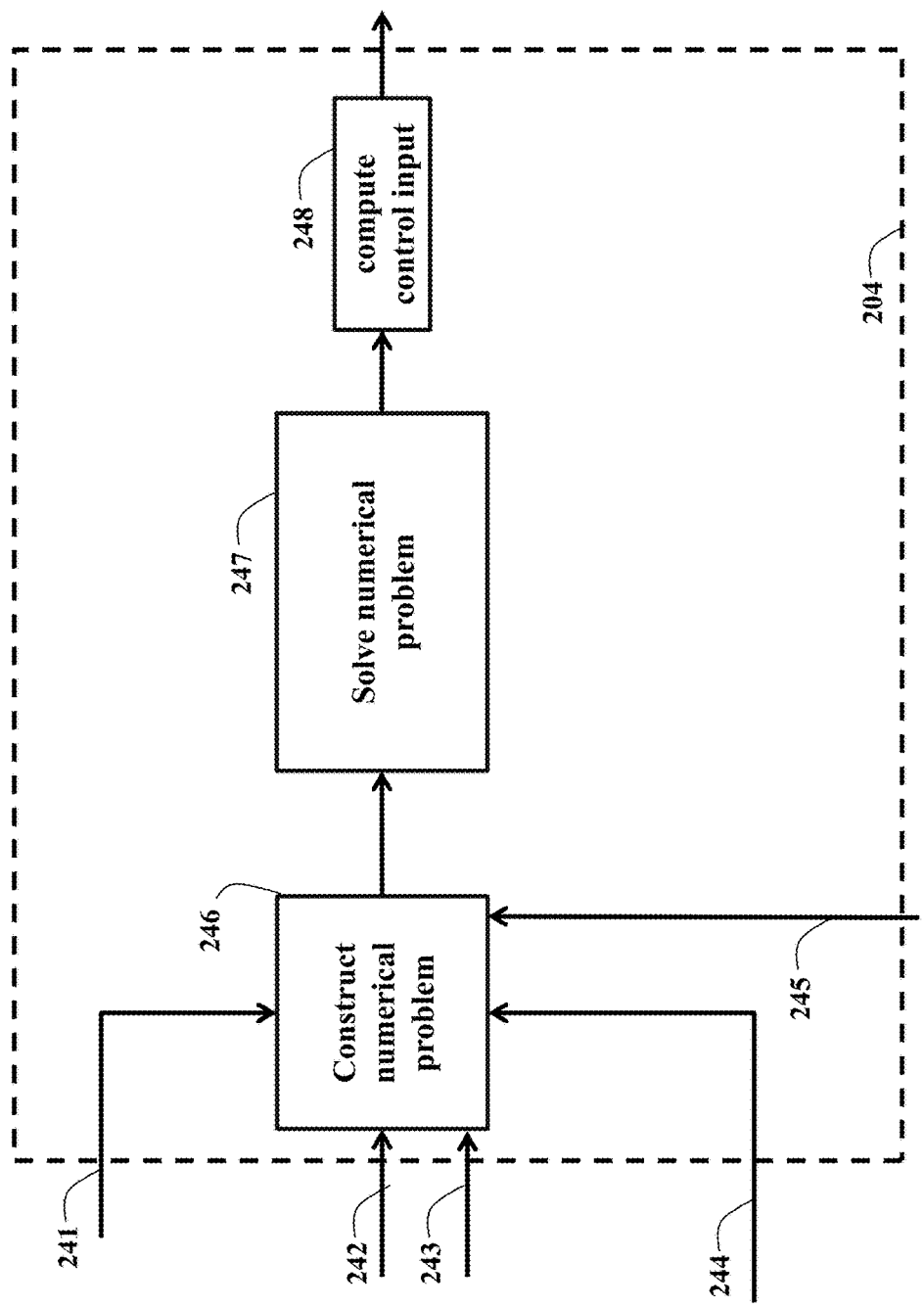
FIG. 2E is a block diagram of the module of the controller that computes the control input according to one embodiment of the invention.

FIG. 2E shows the details of the computation of the control input. From the adjusted model 241, adjusted cost function 242, prediction horizon 243, MPC constraints 244, and current machine state 245, a numerical problem is constructed 246, solved 247 by a numerical algorithm, and from the solution, the control input is selected 248.

FIG. 2F shows a flowchart of the operation of the method in some embodiments of this invention. First the adjustable controller is designed 250 by determining collection of models 212, the cost function components 221, the constraints and the preferred horizon 232, and the parameters loaded in the control system memory 120, including the computed MPC constraints and prediction horizon 203. Then, the controlling of the machine begins. At each iteration, a new parameter estimate is determined 251, the current machine model is adjusted 252, the cost function is adjusted 253 and the machine state is determined 254. Then, the control input is computed 255, by first determining 256 a sequence of predicted inputs that satisfies the constraints and optimizes the cost function and then selecting 257 the initial part of such sequence. Then, the controller waits for next measurement 258.

Figure 2G:
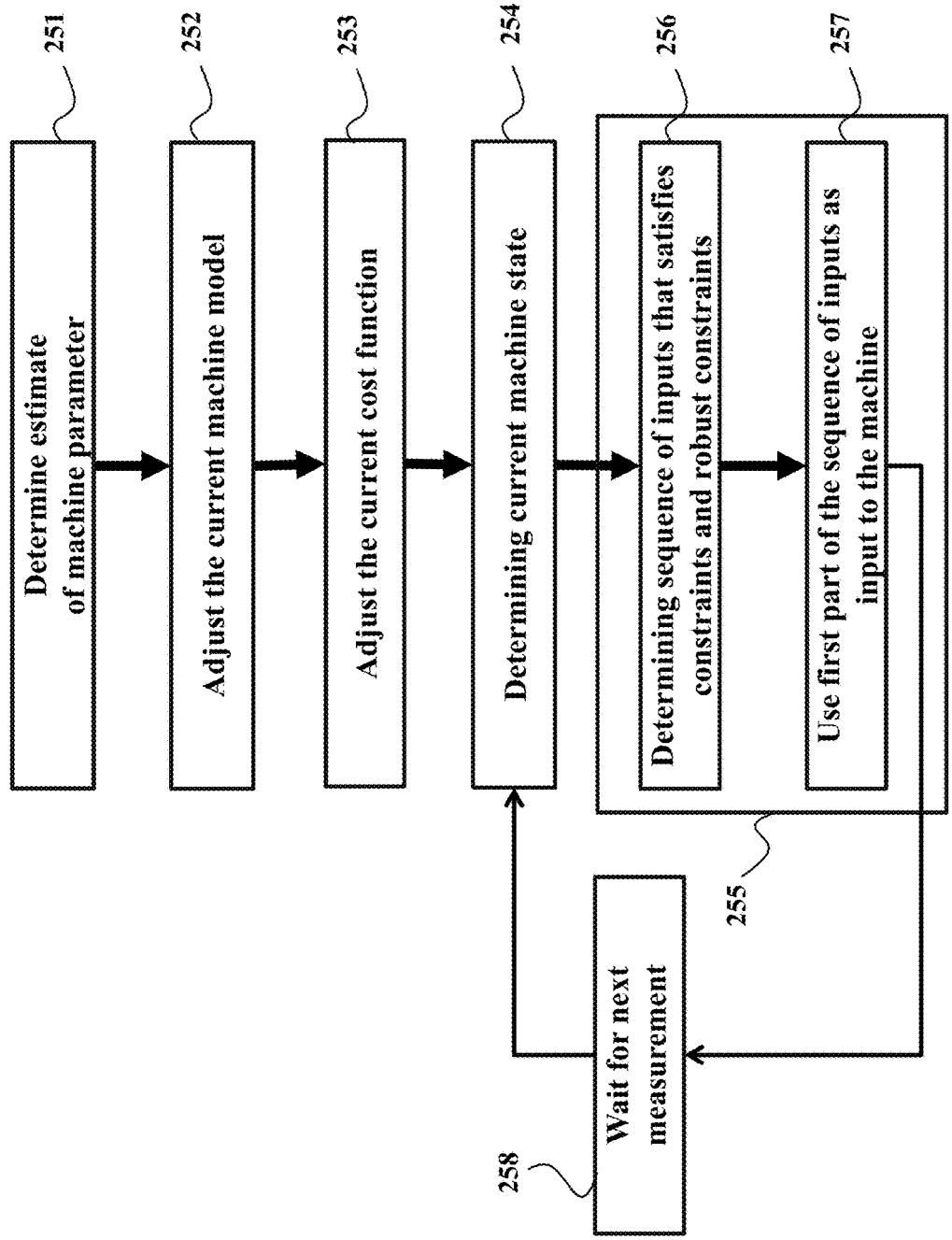
FIG. 2G is a flow chart of the method executed by the modules of the controller according to another embodiment of the invention.

FIG. 2G describes a flowchart of the operation of the method in other embodiments of this invention. The operations are the same, however the adjustment of model and cost function occurs only once, before the selection of the first input, but after the controller memory has been programmed.

Adjustment of Model

Some embodiments of the invention are based on the realization that even if the true values of the parameters of the models are uncertain, the uncertainties of the parameters of the model are within a known range. For example, the mass of the train can be within a range of values for an empty train and fully loaded train. The ensemble of models 212 represents the models obtained for all the possible values of the uncertain parameters of the model.

Figure 3A:
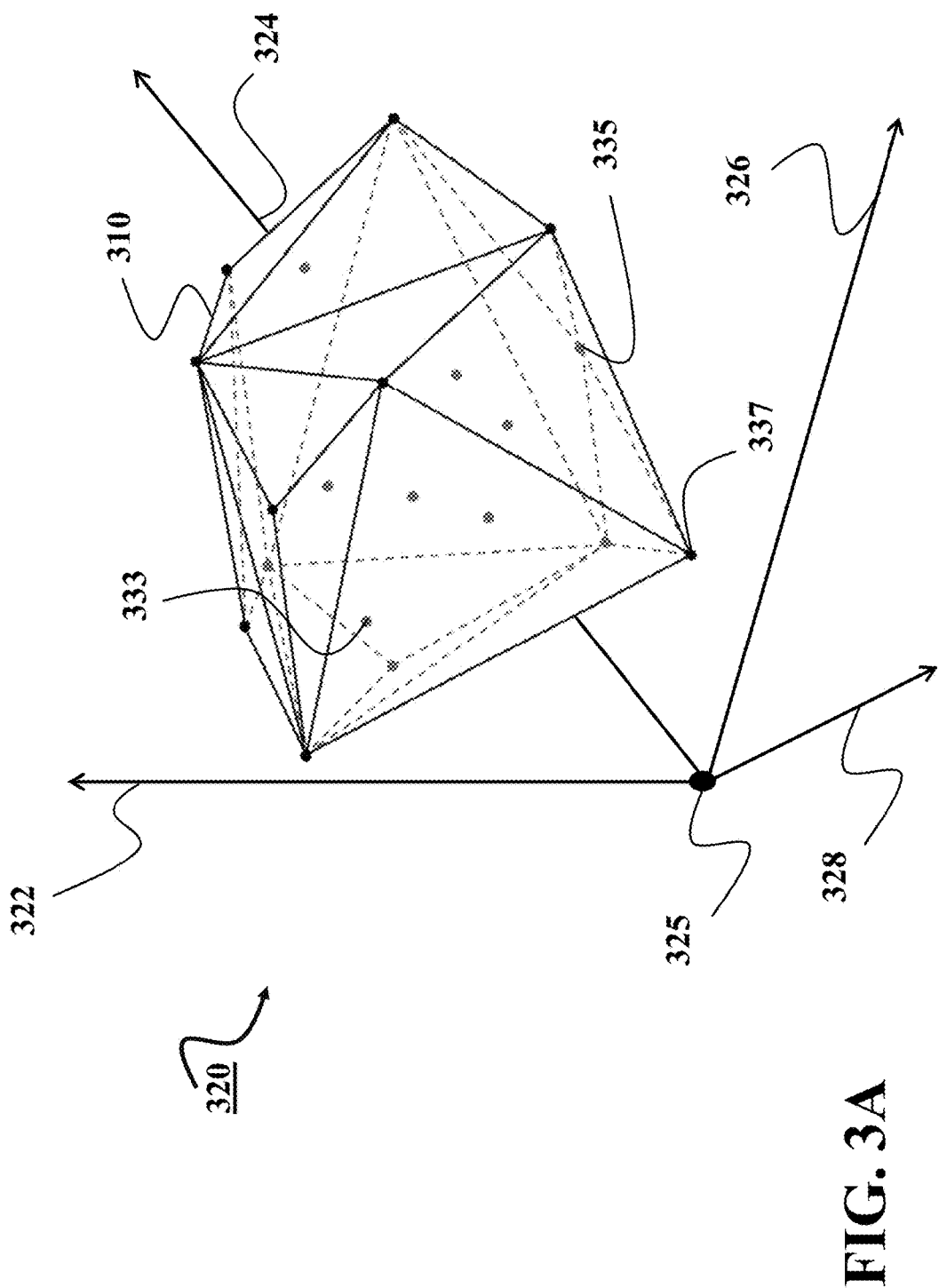
FIG. 3A is a schematic of an exemplar polytope arranged in the coordinate system visualizing the principles of some embodiments of the invention.

FIG. 3A shows an exemplar polytope 310 arranged in a coordinate system 320 visualizing the principles of the above realization. The coordinate system 320 is usually a low-dimensional system of parameters of the model having the uncertainties. For example, if the model includes four parameters with uncertainties, the coordinate system 320 is four dimensional coordinate system with an origin 325 and one dimension 322, 324, 326, and 328 for each of the parameters such that new values of the combination of parameters, e.g., values 333, 335, 337 are selected within the polytope 310.

For example, a function that describes the motion of the machine at equally time-spaced sampling instants by a system of difference equations for a given machine state, input, and uncertainty d is i. $x(k+1) = f(x(k), u(k), d(k))$ $$y(k) = Cx(k) \qquad (1)$$

where k is the index of the sampling instant, $f$ is a generic function, C is a matrix, x is the machine state 106, u is the machine input 104 and y is the machine output 105. It is realized that in a number of situations the uncertainties are bounded within the range D, the states are bounded within the range $\mathcal{X}$, and the control inputs are bounded within the range U ii. $x \in \mathcal{X}, u \in \mathcal{U}, d \in D.$ \qquad (2)

For instance, the range of values D can be determined by the minimum and maximum value of the machine mass. Similarly, the ranges of the inputs and states can be determined by minimum and maximum values of velocities, positions, voltages, or torques.

Some embodiments, based on $f$ and D, construct a set of matrices $$\{(A_i, B_i)\}_{i=1}^l \qquad (3)$$

that results in the polytopic difference inclusion i. $co\{A_i x + B_i u\}_{i=1}^l$ \qquad (4)

such that for any given x and u, ii. $co\{A_i x + B_i u\}_{i=1}^l \supseteq f(x, u, d), \forall d \in D,$ \qquad (5)

where 'co' indicates the convex hull of the set.

The polytopic difference inclusion (4) is described by the collection of models 212 i. $\{A_i x + B_i u\}_{i=1}^{l}$ (4A)

The linear models in Equation (4a) can be determined, for instance, by taking the maximum and minimum of the parameters that form vector d allowed by D, and/or of their combinations. Also, (4) can be constructed such that the desired value of the machine motion is placed at x=0.

Figure 3B:
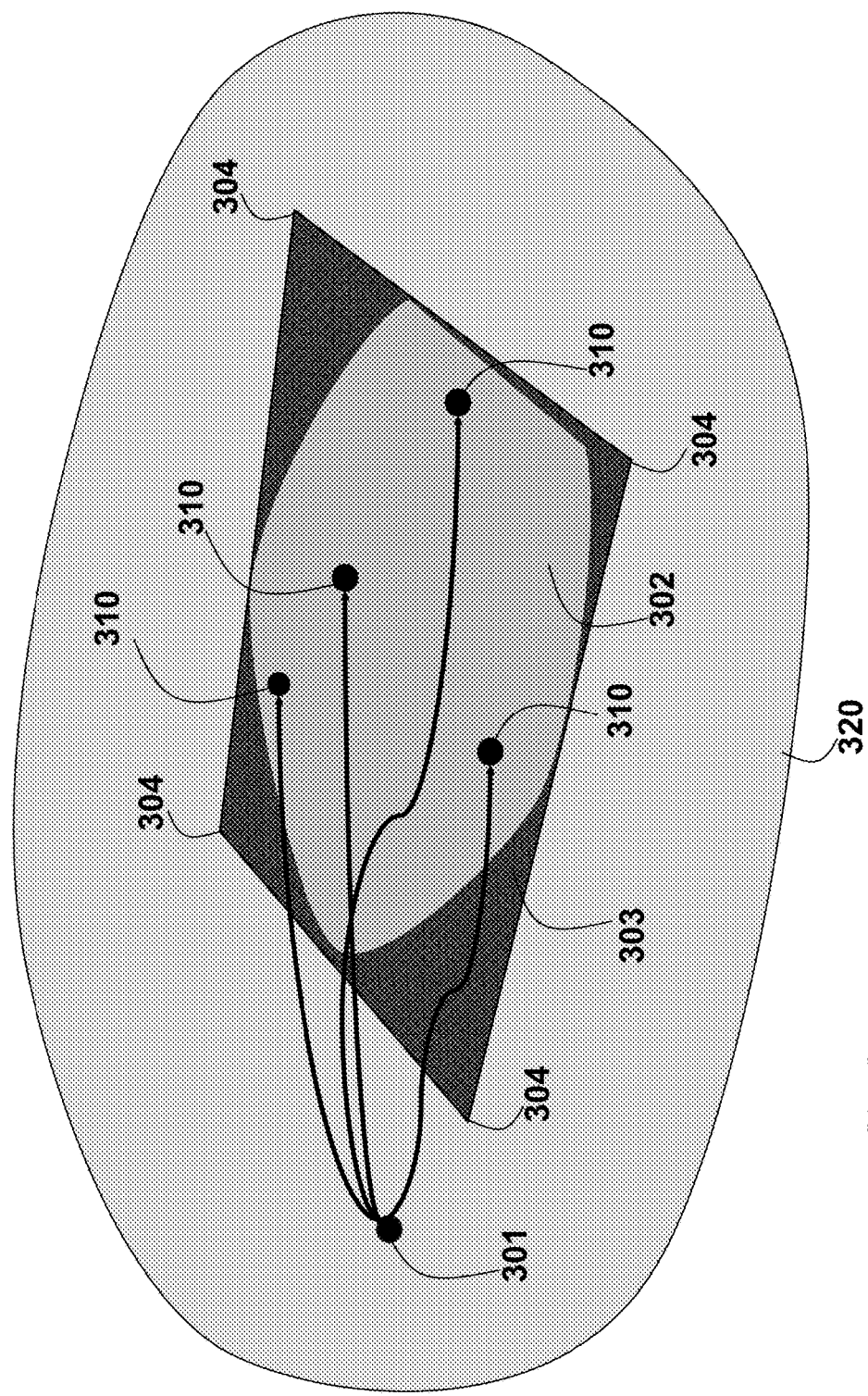
FIG. 3B is a schematic of effect of the uncertainties of the parameters of the model on a state of the machine.

FIG. 3B shows a schematic of effect of the uncertainties of the parameters of the model determined by Equation (4) in estimating the state of the machine Given the current state x 301 of the machine and a control input, the next state of the machine can vary within a set 302 for different possible values of d of the parameters of the model of the machine. For instance, depending on specific values of the vector d, the state 302 can be transition to different states 310 within the set 302 for the same value of the control input.

In some embodiments of the invention, the collection of models is designed such that the models for all values of the uncertain parameters within their ranges is included into a convex combination 303 of linear model. For example, the model of Equation (4) over-approximates the set 302 by set 303 which is a bounded polyhedron, or polytope, where the vertices 304 are determined from i. $v_i = A_i x + B_i u$, $i=1 \ldots l$ (6)

wherein l, $(A_i, B_i)$, i=1, . . . , l are the number and the matrices, respectively, defined in Equation (3).

Based on Equation (4) an input u in the range $\mathcal{U}$ that satisfies all i. $A_i x + B_i u \in \mathcal{X}$, $i=1$ (7)

makes the set 303 entirely in the range of admissible states, 320, and hence also the possible next state of the machine 302 according to (1) is within 320. Thus, enforcing constraints on Equation (4) guarantees enforcement of the constraints on Equation (1). The embodiments that use the model determined by Equation (4) are computationally advantageous, because the model determined by Equation (4) includes a set of linear models, rather than uncertain nonlinear models described in Equation (1).

Thus in general the uncertain system model can be written as i.

$$x(t+1) = \sum_{i=1}^{l} [\xi]_i (A_i x + B_i u) \quad (8)$$

where $\xi$ is unknown but satisfies ii.

$$\xi \in \mathbb{R}^l, 0 \leq [\xi]_i \leq 1, \sum_i [\xi]_i^l = 1, \quad (9)$$

such that the uncertain system model is the convex combination of the ensemble of models (7), and $[a]_i$ denotes the $i^{th}$ component of vector a.

The model for a specific realization of the uncertain parameters is written i.

$$\hat{A}x + \hat{B}u = \sum_{i=1}^{l} [\xi]_i (A_i x + B_i u), \quad (10)$$

thus, the estimation module 106 provides a current estimate of the parameters at time t by determining $\xi(t)$ and the corresponding estimated model (10).

For instance, the module 106 can find $\xi(t)$ as the value that provide the best fit while considering a recent set of input and output or state data, possibly with some move reduction term $$\xi(t) = \arg \min_{\xi} \sum_{k=t-N_e}^{t} \| x(k) - m(\xi, k) \| \quad \text{s.t.} \quad m(\xi, k) =$$

$$\Sigma [\xi]_i A_i x(k-1) + B u(k-1)$$

However, the embodiments of this invention are not restricted to a specific estimation module, as they work for any estimation module as long as this provides a valid estimate $\xi(t)$ that satisfies (9).

Adjustment of Cost Function

The cost function of MPC controller encodes the desired priority of regulating the states of the machine to achieve the desired machine behavior while limiting the use of the machine actuation system so to save energy, minimize vibration, reduce wear of parts.

Thus, for models such as (10) where $\xi$ is fixed and known when the controller is designed the MPC cost function can be written as $$\sum_{k=0}^{N-1} x(k)' Q x(k) + u(k)' R u(k), \quad (11)$$

where Q, R are weighting matrices that encode the desired priority of regulating the states of the machine However, the cost function (11) that encodes the performance objective of the controlling of the machine needs to be modified to obtain guarantees of converging to the desired state and stability of the machine operation. For example, it is possible to add a stabilizing term to (11) which for models such as (8) results in $$x(N)' P x(N) \quad (12)$$

Thus, the complete cost function is the combination of the performance term (11) and the stability term (12)

$$x(N)' P x(N) + \sum_{k=0}^{N-1} x(k)' Q x(k) + u(k)' R u(k) \quad (13)$$

where P is an appropriately designed weighting matrix for the terminal state at the end of the MPC prediction horizon.

Some embodiment of the invention are based on realization that while the model changes due to changing estimates of the system parameters, the performance term (11) can remain unchanged, but the stabilizing component (13) needs to be adjusted to achieve stability of the updated model. Accordingly, some embodiments modify the stabilizing component to include a stabilizing term that depends on the parameter estimate that is $$x(N)'P(\xi(N))x(N) \qquad (14)$$

where $P(\xi)$ is a parameter dependent weight matrix.

According to some embodiments, the term $P(\xi)$ for the collection of models (7) and the uncertain model (8), (9) includes convex combination of matrix weights obtained from the current estimate of the parameter $\xi$, $$P(\xi) = \sum_{i=0}^{l} [\xi]_i P_i \qquad (15)$$

It is further realized that for the case where $B_i=B$, $i \in i=1, \ldots, l$, the matrix weights in (15) can be designed by solving the linear matrix inequality $$\begin{bmatrix} G_i + G_i' - S_i & (A_iG_i + BE_i)' & E_i' & G_i' \\ (A_iG_i + BE_i) & S_j & 0 & 0 \\ E_i & 0 & R^{-1} & 0 \\ G_i & 0 & 0 & Q^{-1} \end{bmatrix} > 0, \forall i, j \in \mathbb{Z}_{[1,l]}. \qquad (16)$$

for variables $G_i$, $S_i \in \mathbb{R}^{n \times n}$, $S_i > 0$, $E_i \in \mathbb{R}^{m \times n}$, $i \in \mathbb{Z}_{[1, l]}$, and then computing $$P_i = S_i^{-1}, K_i = E_i G_i^{-1}, i \in \mathbb{Z}_{[1,l]}, \qquad (16b)$$

to construct the matrices in (15).

Instead, the liner matrix inequality can be represented as $$\begin{bmatrix} G + G' - S_i & (A_iG + BE)' & E' & G' \\ (A_iG + BE) & S_j & 0 & 0 \\ E & 0 & R^{-1} & 0 \\ G & 0 & 0 & Q^{-1} \end{bmatrix} > 0, \forall i, j \in \mathbb{Z}_{[1,l]}. \qquad (17)$$

$S_i \in \mathbb{R}^{n \times n}$, $S_i > 0$, $E, G \in \mathbb{R}^{m \times n}$, is solved and $$P_i = S_i^{-1}, i \in \mathbb{Z}_{[1,l]}, K = EG^{-1}. \qquad (17b)$$

The complexity of linear matrix inequalities can grow for large-scale systems. However, some embodiment's exploit symmetries of the model of the machine to reduce computational cost. A symmetry is a pair of invertible matrices $\Theta$ and $\Omega$ such that for all $i \in \mathbb{Z}_{[1, l]}$ there exists $j \in \mathbb{Z}_{[1, l]}$ that satisfy $$\Theta A_i \Theta^{-1} = A_j$$

$$\Theta B \Omega^{-1} = B$$

$$\Theta X = X$$

$$\Omega U = U.$$

Some embodiments of the invention are based on the realization that because the symmetry relates extreme systems models $A_i$, the extreme cost functions and controllers can be related. Accordingly, one embodiment determines at least part of the stabilizing term (14) of the cost function (13) using a symmetry between values of the parameter of the model to reduce the computations in solving (16), (17).

For example, some embodiments solve the equations (16), (17) only for the models in the collection that are not related by symmetry, thus reducing the number of variables in (16), (17) and thus making them easier to solve. For example, denote by $\mathcal{I}^1 \subseteq \mathbb{Z}_{[1, l]}$ a subset of the models $A_i$ in the collection of models that are not related by symmetry. Also, denote by $\mathcal{I}^2 \subseteq \mathbb{Z}^2_{[1, l]}$ a subset of pairs (i, j) of models in the collection that are not related by symmetry. Some embodiments determine variables $S_i$, $G_i$, and $E_i$ only once for each symmetrically unrelated model $i \in \mathcal{I}^1$ in the collection. Also, some embodiments solve the equations (15) only once for each symmetrically unrelated pair $(i,j) \in \mathcal{I}^2$.

For example, one embodiment solves $$\begin{bmatrix} G_i + G_i' - S_i & (A_iG_i + BE_i)' & E_i' & G_i' \\ (A_iG_i + BE_i) & \Theta S_k \Theta^{-1} & 0 & 0 \\ E_i & 0 & R^{-1} & 0 \\ G_i & 0 & 0 & Q^{-1} \end{bmatrix} > 0$$

for each $(i, j) \in \mathcal{I}^2$ where $i \in \mathcal{I}^1$ and $\Theta S_k \Theta^{-1} = S_j$. Then the embodiment determines $$E_k = \Omega E_i \Theta^{-1}$$

$$G_k = \Theta G_i \Theta^{-1}$$

$$S_k = \Theta S_i \Theta^{-1}$$

for each $k \notin \mathcal{I}^1$ where $A_k = \Theta A_{i\Theta}^{-1}$ for $i \in \mathcal{I}^1$.

Constraints Computation

Some embodiments of the invention are based on realization that in order to guarantee that the constraints on the machine motion are satisfied during the operation of the machine for all variation of the values of the parameters of the model within the predetermined range, a subset of the feasible region $\mathcal{X}$ of the states can be determined, such that whenever the state of the machine is in such a subset, there exists at least one admissible control input such that the state remains in the subset for all possible values of the parameters and the disturbances. By remaining in the subset, all the machine motion constraints are satisfied because the subset is included in the feasible region $\mathcal{X}$.

Some embodiments of the invention determine and use such constraints on the control inputs, referred herein as control-invariant constraints on the control inputs, to determine a control input that maintains the state of the machine in such a subset of the feasible region $\mathcal{X}$ of the states, referred herein as a control-invariant subset of states. By the construction, a control input satisfying the control-invariant constraints maintains a state of the machine in a control-invariant subset of states satisfying constraints on the operation of the machine for all values of the parameter of the model within the range defined by the uncertainty model.

Figure 4A:
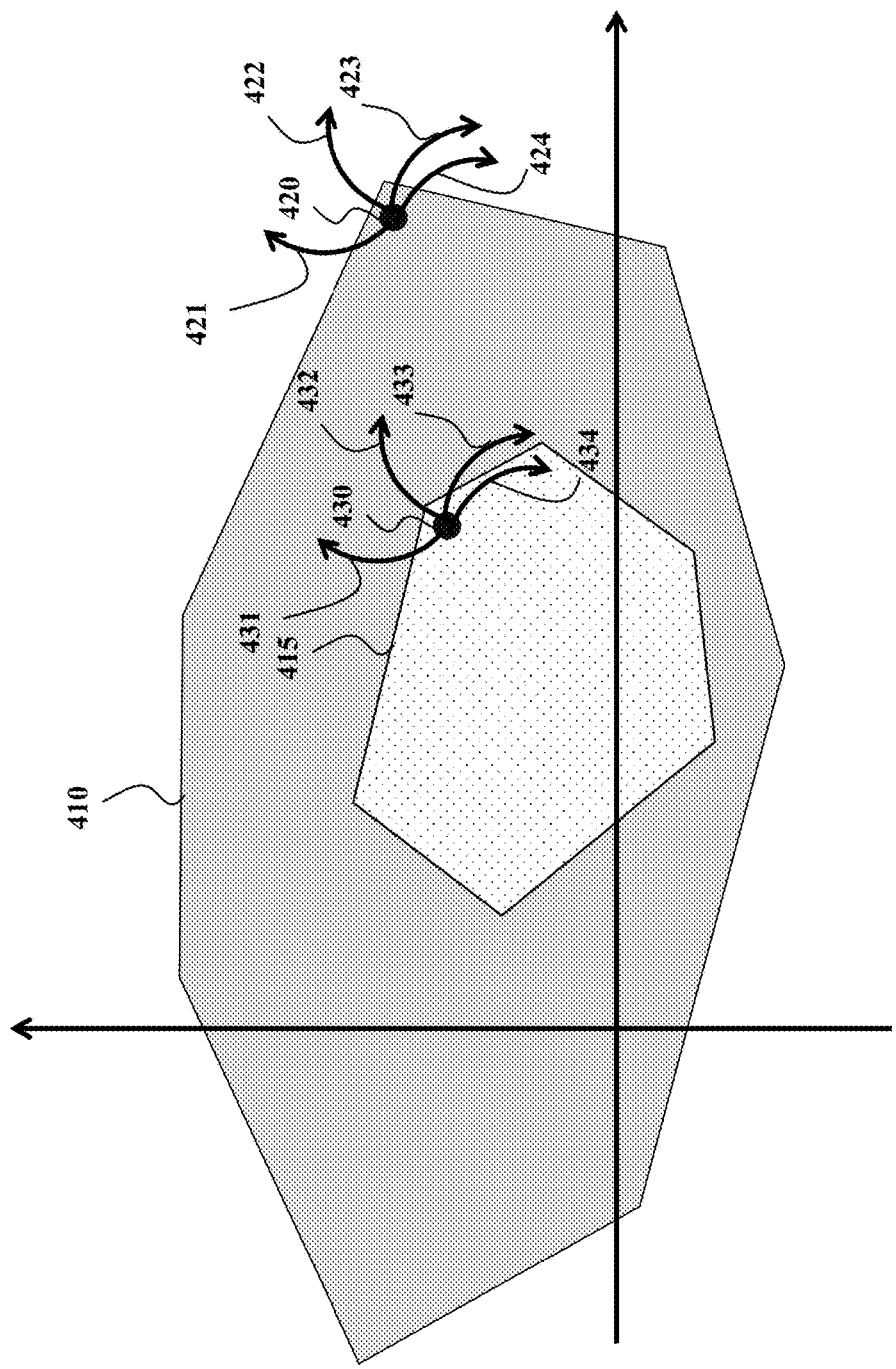
FIG. 4A is a schematic of an example of a two-dimensional projection of the control-invariant subset of states defined by various constraints on the operation of the machine according to some embodiments of the invention.

FIG. 4A shows an example of a two-dimensional projection of the control-invariant subset of states 410 defined by various constraints on the operation of the machine according to embodiments of the invention. Typically, the feasible region is a multi-dimensional polytope determined by hyperplanes, which are represented by linear inequalities, along multiple dimensions corresponding to the constraints on the operation.

Due to the nature of receding horizon control, the existence of a solution for a certain horizon does not by itself guarantees the existence of the solution for a subsequent horizon. For example, the state of the machine and a state of the reference trajectory 420 can be optimal and feasible for one iteration, but all control actions 421-424 that controller is allowed to take during the next iteration can bring a state of the machine outside of the feasible region 410.

Some embodiments of the invention are based on yet another realization that it is possible to select a control-invariant subset 415 of the feasible region, such that from any state of the machine within that control-invariant subset, there is a control input maintaining the state of the machine within the subset for the known future states of the reference trajectory or for all admissible future states of the reference trajectory. For example, for any state such as a state 430 within the subset 415 and within all possible control inputs 431-434 that the controller can execute, there is at least one control input 434 that maintains the state of the machine and reference within the subset 415. In this case, the subset 415 is a control invariant subset.

Some embodiments determine the control invariant subset of state for the model of Equation (4), such that for each state within the control invariant subset there is at least one control action maintaining the state of the machine within the control invariant subset for all possible states values according to Equation (5).

Figure 4B:
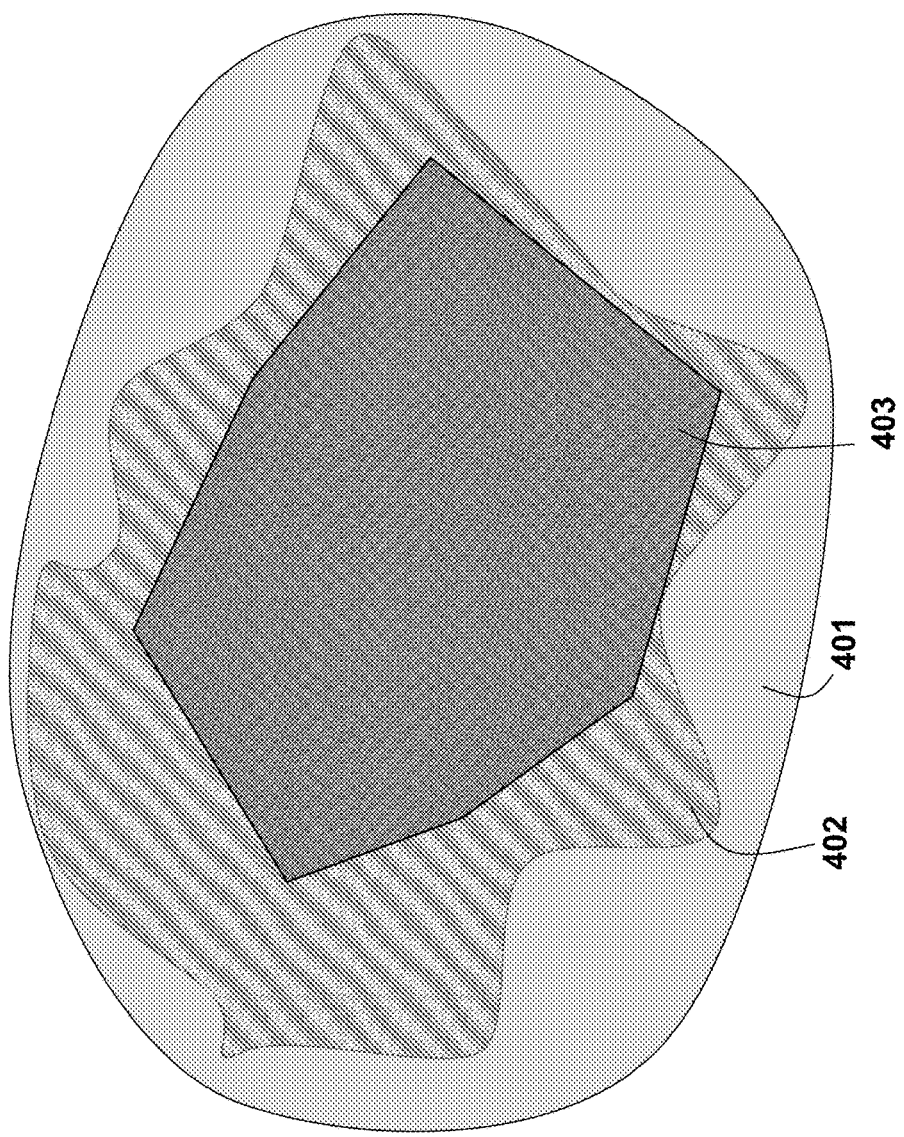
FIG. 4B is a schematic showing the relation between the feasible region of the states of the machine and control invariant subsets determined according to some embodiments of the invention.

FIG. 4B shows the relation between the feasible region 401 of the states of the machine, the largest control invariant subset 402 of the state for the model with uncertainties according to Equation (1) within $\mathcal{X}$. In some embodiments the control invariant subset 402 is reduced to form control invariant subset 403, which is less than the subset 402, but has a simpler shape formed by linear equations. Because the subset 402 is determined by nonlinear equations, the shape of the subset 402 can be non-convex. Thus, computation of 403 is simpler, more efficient and advantageous for control purposes.

Figure 5:
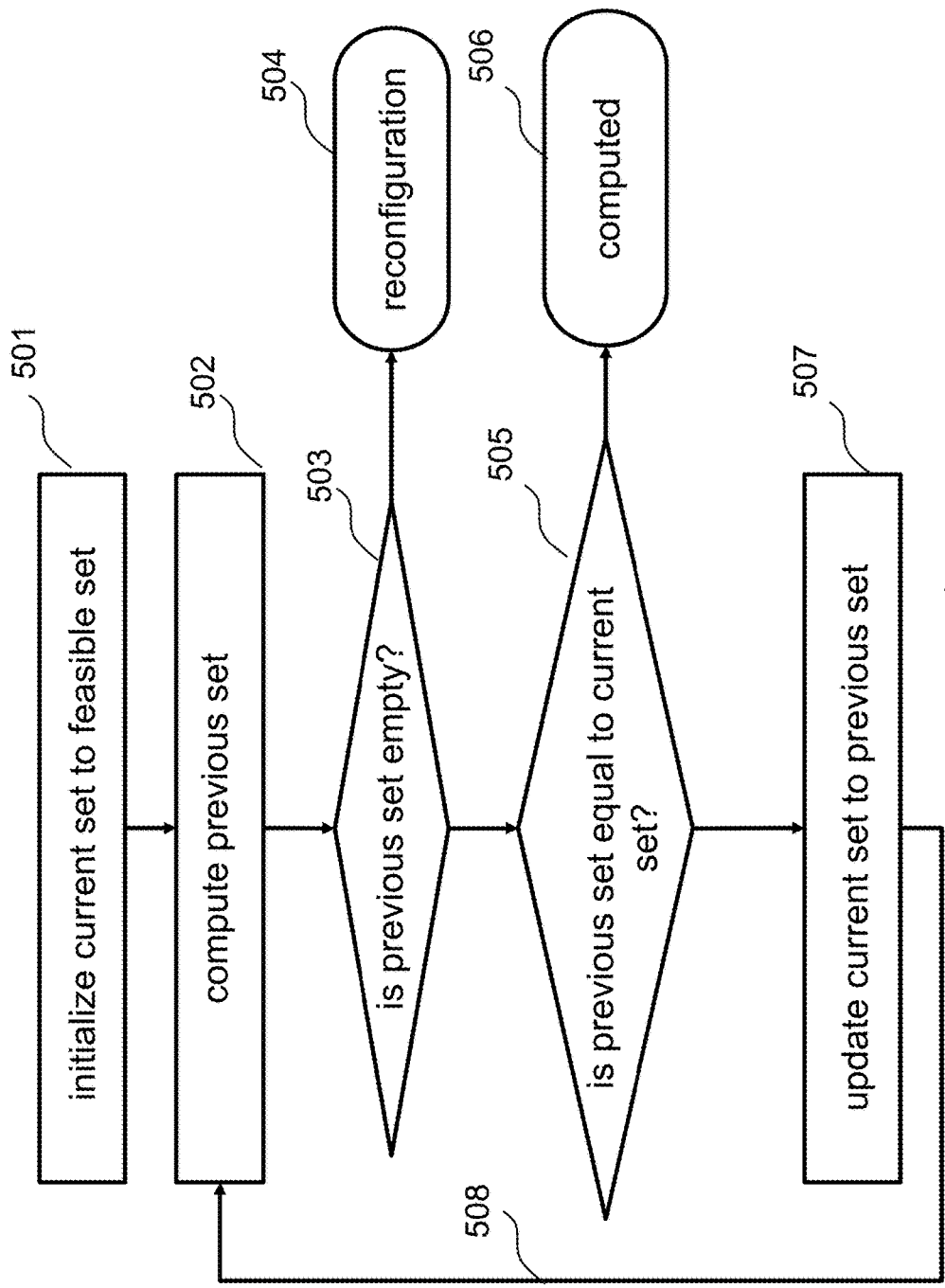
FIG. 5 is a block diagram of a backward-reachable region computation for determining the control invariant subset according to one embodiment of the invention.

FIG. 5 shows a block diagram of a backward-reachable region computation for determining the control invariant subset 403 starting from the feasible region $\mathcal{X}$, 401 according to one embodiment of the invention. The backward-reachable region computation determines the robust control invariant subset $\mathcal{C}_x$ and also the control invariant set $\mathcal{C}_u(x)$, which determines for any x within $\mathcal{C}_x$ the set of inputs u in $\mathcal{U}$ that can be applied so that all possible next states according to (4) are inside $\mathcal{C}_x$.

The backward-reachable region computation initializes 501 a current set $\mathcal{X}_c$ to the feasible set $\mathcal{X}$ and determines 502 a previous set of states $\mathcal{X}_p$ as a subset of the current set $\mathcal{X}_c$ such that for all states x in $\mathcal{X}_p$ there exists an input u in $\mathcal{U}$ such that for all the possible values of the parameters p in P, the updated state is in the current set $\mathcal{X}_c$.

If 503 the previous set $\mathcal{X}_p$ is empty 504, correct operation of the controller cannot be guaranteed, which means that the set P of possible values of the parameters should be reduced in size, possibly by changing the design or objective of the operation of the machine. If 505 the current set and the previous set are equal, that is also 506 the set $\mathcal{C}_x$ otherwise, the previous set is assigned 507 to be the current set and the computation iterates 508 again. When the set $\mathcal{C}_x$ is found the last computed set of state-input couples is the robust admissible input set $\mathcal{C}_u(x)$ for all x within $\mathcal{C}_x$.

Figure 6:
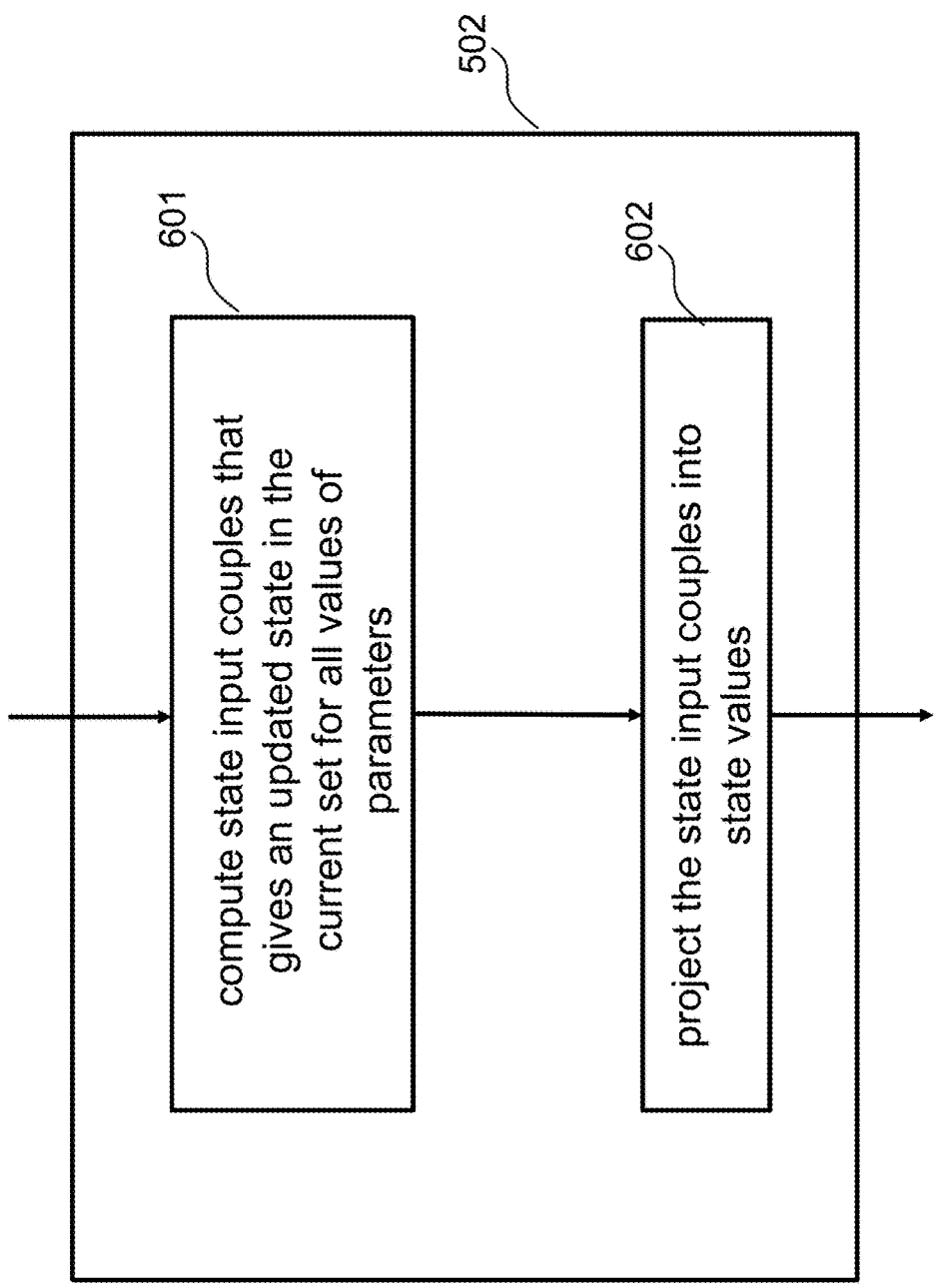
FIG. 6 is a block diagram of an exemplar implementation of determining the previous set of states according to one embodiment of the invention.

FIG. 6 shows a block diagram of an exemplar implementation of determining 502 the previous set of states according to one embodiment. The embodiment identifies 601 the state-input couple that generates an updated state that is in the current set for all the values of the parameters, and projects 602 the state input couples into state values, i.e., the embodiment identifies the states that belongs to at least one of such state-input couples.

A method of computation of the couples of states-inputs 601 is based on determining the couples (x, u) such that the updated state is inside the current set for all the models in the ensemble, i.e., $A_i x + B_i u \in \mathcal{X}_c$, $\forall i=1, \ldots, l$.

In addition to the specification constraints on the operation of the machine, some embodiments add additional constraints to the MPC in order for the machine state to converge to the desired value. For example, such an additional constraint is a terminal constraint, such as $$x(N) \in \mathcal{X}_N, \quad (18)$$

which determines a region for the terminal state at the end of the MPC prediction horizon.

In some embodiments, such terminal constraint is determined according to the specification constraints and the model of the machine. However, such a determination is difficult when the model of the machine is uncertain. Thus, an alternative embodiment of the invention determines the terminal constraint using the specification constraints 231, the collection of models 211 and the cost function components 221.

For example, one embodiment determines the terminal constraints as a set $$\mathcal{X}_N = \{x : (A_i + B_i K_j)^t x \in \mathcal{X}, K_j x \in U, \forall i,j \forall \mathbb{Z}_{[1,l]}, t \in [0,\infty)\}, \quad (19)$$

which is the set of initial states where the machine controlled from the control gains $K_i$, $i=1, \ldots, l$ or K in (16b) or (17b) obtained by solving (16) or (17), respectively, satisfies the constraints.

Some embodiments determine the set of the terminal constraint as the fixed point of a sequence of backward reachable sets by $$\mathcal{X}^{(0)} = \{x : (x, K_j x) \in \mathcal{X}_{xu}, \forall i \in \mathbb{Z}_{[1,l]}\}$$

$$\mathcal{X}^{(h+1)} = \{x : (A_i + BK_i)x \in \mathcal{X}^{(h)}, \forall i \in \mathbb{Z}_{[1,l]}\} \cap \mathcal{X}^{(h)}, \quad (20)$$

where $\mathcal{X}_{xu} \subseteq \mathcal{X} \times U$ is any subset of feasible states and inputs.

Figure 7:
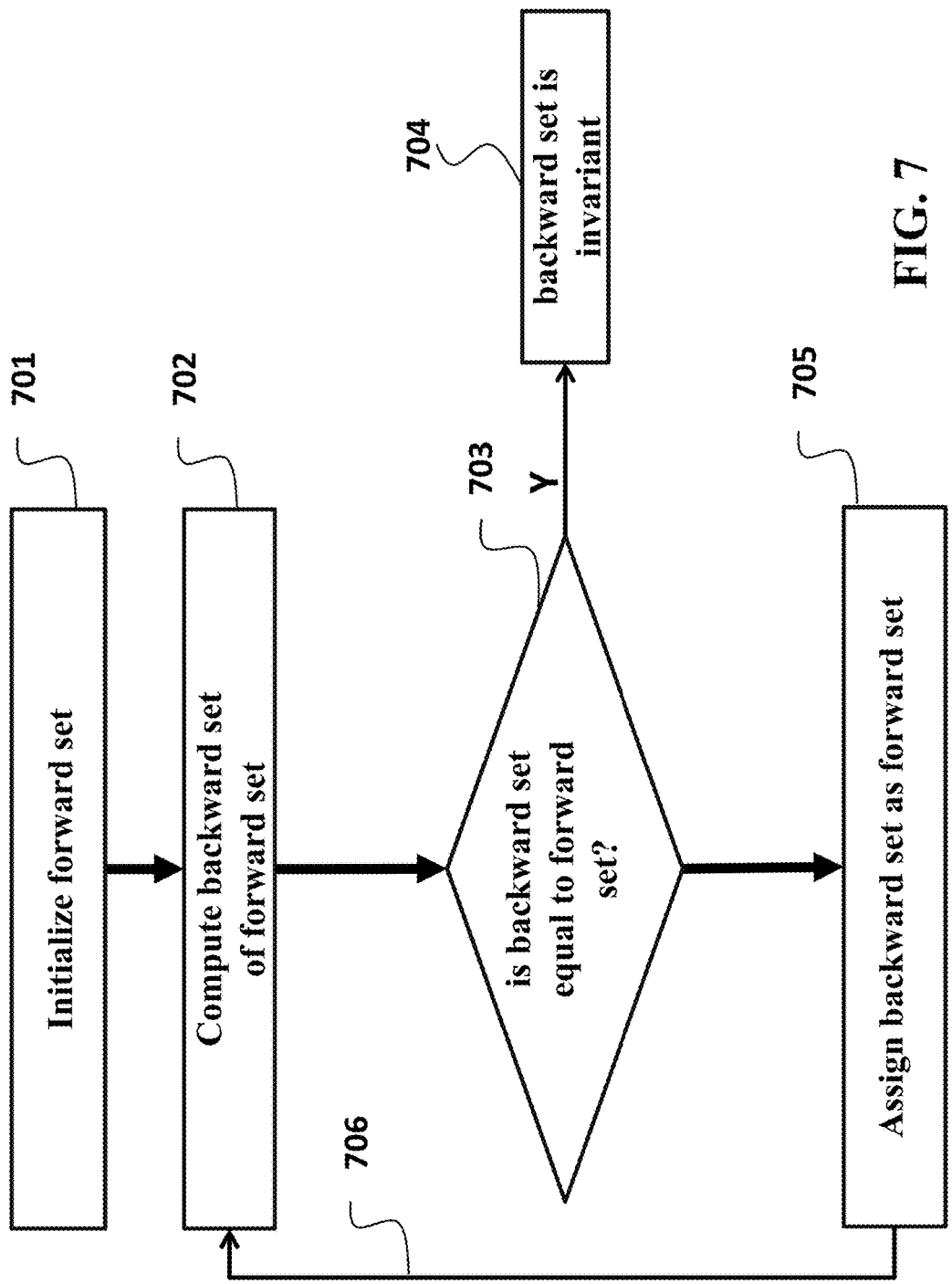
FIG. 7 is a block diagram of a method for determining the region associated with the terminal constraint

FIG. 7 shows a block diagram of a backward reachable method for determining a region corresponding to the terminal constraint according to one embodiments of the invention. The backward reachable method iteratively determines, starting from a current set of feasible states of the machine, a backward reachable set of the states within the current set that after a one step evolution of dynamics of the machine is inside the current set until the backward reachable set of states of the machine is enclosed by the current set.

For example, a current set is initialized 701 as a set of feasible states where the input generated by control gains $K_i$, $i=1, \ldots, l$ or K in (16b) or (17b) obtained by solving (16) or (17), respectively, satisfy input constraints. From the current set, a backward reachable set is computed 702 to determine the states within the current set that after a one step evolution of the system dynamics are inside the current set. If 703 the backward reachable set contains or equals the current set, then 704 the current set is the maximal control invariant set. Otherwise 705, the backward reachable set intersects with the current set, and used as the new current set, in a repetition 706 of the method.

In some embodiments, due to the presence of invariant constraints, the backward reachable method in FIG. 7 is initialized according to $$\mathcal{X}_{xu} = \{(x,u), u \in \mathcal{C}_u(x)\} \subseteq \mathcal{X} \times U.$$

However, in order to guarantee that the terminal constraint (18) can always be satisfied, some embodiments modify the prediction horizon. Such an adjustment helps to ensure that the terminal constraints can be satisfied, that is, that the region corresponding to the terminal set can be reached by any feasible initial state within the length of the prediction horizon.

To that end, some embodiments determine a minimal length of the prediction horizon for which there is a solution to the optimization of the cost function for all states satisfying the control invariant constraints. Next, the embodiments determine a length of the prediction horizon as largest between a preferred length and the minimal length.

For example, some embodiments determine the minimum prediction horizon $N_m$ such that the equation (3) can always be satisfied for $x(0) \in \mathcal{C}_x$ and if the preferred horizon $N_p$ 232 is less than $N_m$, the embodiments set $N=N_m$, otherwise the embodiments set $N=N_p$. The computation of the minimum horizon can be obtained by determining the minimum index $N_m$ such that the set $\mathcal{S}^{(N_m)}$ determined from the sequence of intersected backward reachable sets according to $$\mathcal{S}^{(0)} = \mathcal{X}_N,$$
$$\mathcal{S}_i^{(h+1)} = \{x \in \mathcal{X} : \exists u \in \mathcal{U}, A_i x + Bu \in \mathcal{S}^{(h)}\},$$
$$\mathcal{S}^{(h+1)} = \bigcap_{i=1}^{l} \mathcal{S}_i^{(h+1)}.$$
(21)

is such that $\mathcal{S}^{(N_m)} = \mathcal{C}_x$.

Some embodiments take advantage from the realization that if the terminal set $\mathcal{X}_N$ is control invariant, that is, it is invariant for any combination of models in the collection and gains $K_j$ obtained from equations (16), (17), then a control invariant $\mathcal{C}_x$ that also guarantees that the constraint (18) is always satisfied can be computed for the preferred prediction horizon.

In one embodiment, this computation is obtained by constructing $N_p$-steps backward reachable set by performing exactly $N_p$ iterations of the equations $$\mathcal{R}^{(0)} = \mathcal{X}_N,$$

$$\mathcal{R}^{(h+1)} = \{x \in \mathcal{X} : \exists u \in \mathcal{U}, A_i x + Bu \in \mathcal{R}^{(h)}, \forall i \in \mathbb{Z}_{[1,l]}\}. \quad (33b)$$

In this case the MPC horizon can be set equal to the preferred horizon set $N=N_p$ and $\mathcal{C}_x = \mathcal{R}^{(N)}$.

For instance if $B_i=B$, $i \in i=1, \ldots, l$ and (17) is solved, then $\mathcal{X}_N$ computed from (20) is robust invariant and the method in (33b) can be used.

Prediction Model

Some embodiments of the invention are based on realization that since the MPC controller needs to predict the evolution of the model along its prediction horizon N, the estimate of the model at time t cannot be used for all prediction steps. Instead, the current estimate at time t, $\xi(t)$ is placed into the delay buffer 211, that has the length of the MPC prediction horizon N and that includes the most recent N values of the estimates $\xi$. Then, the construction of the numerical problem 246 builds the MPC prediction model from all the past estimates placed on the delay buffer.

Thus, the prediction model k steps in the future with respect to control time t is obtained as $$x_{k+1|t} = \sum_{i=1}^{l} [\xi(t-N+k)]_i (A_i x_{k|t} + B_i u_{k|t}) \quad (22)$$

for all $k \in [0, N]$.

Thus, in some embodiments the model used for determining the control inputs for the prediction horizon varies for different steps along the prediction horizon. For example, the model of equation (22) is a linear time varying systems constructed from the collection of the models and the N most recent estimates of the parameter, where at each step along the prediction horizon, the parameter estimate obtained N steps before is used.

Accordingly, the stabilization term (14) of the cost function is adjusted from $\xi(t)$, by setting $\xi(N)=\xi(t)$ in (14) and evaluating (14) by (15).

For the case where the adjustment of the parameters occurs only before of the operation of the machine, in this invention it is realized that it is enough to set $$\xi(t-N+k) = \hat{\xi}, \forall t, N \quad (23)$$

where $\hat{\xi}$ is the estimate obtained at the moment the estimation is terminated, and use such value for both model adjustment (22) and cost function adjustment (14).

Determining Control Inputs

In some embodiments, from the prediction model, cost function, MPC constraints, and the current state x(t) the MPC controller constructs a finite horizon optimal control problem $$V_{\xi_t^N}^{MPC}(x(t)) = \quad (24)$$

$$\min_{U_t} \; x'_{N|t} P(\xi_{N|t}) x_{N|t} + \sum_{k=0}^{N-1} x'_{k|t} Q x_{k|t} + u'_{k|t} R u_{k|t}$$

$$\text{s.t.} \; x_{k+1|t} = \sum_{i=1}^{l} [\xi(t-N+k)]_i A_i x_{k|t} + B u_{k|t}$$

$$u \in \mathcal{U}, x \in \mathcal{X}$$

$$u_{k|t} \in C_u(x_{k|t})$$

$$x_{N|t} \in \mathcal{X}_N$$

$$x_{0|t} = x(t),$$

where $U_t = [u_{0|t} \ldots u_{N-1|t}]$ is the sequence of predicted inputs, $\xi_t^N = [\xi(t-N) \ldots \xi(t)]$, is the sequence of N most recent predictions on system parameters and $v_{\xi^N}^{MPC}(x)$ is the nonnegative value function that holds 0 value only if the state of the machine is at the desired value.

The problem is further converted into a numerical problem, which is a quadratic program as $$\min_{U_t} \; \frac{1}{2} U'_t Q_p U_t + C'_p U_t \; \text{s.t.} \; G_p U_t \le W_p. \quad (25)$$

The solution of the quadratic problem (25) provides the optimal input sequence for the current state and parameter estimate $U^*_t = [u^*_{0|t} \ldots u^*_{N-1|t}]$. The control input for the machine at current time t is then selected as the first element of the optimal control sequence, e.g., $$u(t) = u^*_{0|t}. \quad (26)$$

The capability of computing the solution to (24) is based on the fact that the obtained numerical problem (26) is convex whenever the cost function matrices Q, R are positive definite, for all value of machine state and all admissible estimates of the machine parameters. Also, the satisfaction of the constraints in presence of parameter estimation error is due to the construction of $\mathcal{C}_x$ and $\mathcal{X}_N$. The convergence of the machine to the desired state is due to the construction of the adjusted cost function (13) and terminal constraint (18) according to the embodiments, which guarantees that $$V_{\xi_{t+1}}^{NMPC}(x(t+1)) \leq V_{\xi_t}^{NMPC}(x(t)) - \lambda_{min}(Q)\|x(t)\|^2 + \gamma_{ISS}\|\tilde{\xi}(t-N)\|, \quad (27)$$

where $\lambda_{min}(Q)$ is the minimum eigenvalue of Q, which is greater than 0 since Q is positive definite, and γISS is the sensitivity gain from the estimation error.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools.

Also, the embodiments of the invention may be embodied as a method, of which an example has been provided. The steps performed as part of the method may be ordered in any suitable way. Accordingly, embodiments may be constructed in which acts are performed in an order different than illustrated, which may include performing some acts simultaneously, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A method for controlling an operation of a machine according to a model of the machine having parameters of a physical structure of the machine, comprising:

controlling iteratively the operation of the machine with control inputs determined from an optimization of a cost function along a prediction horizon subject to constraints on the control inputs, wherein the optimization is according to the model, wherein the cost function includes at least one parameter of the model, wherein the parameter of the model is uncertain due to an uncertainty of a value of a component of the physical structure of the machine represented by the parameter; and updating the parameter of the model resulting in updating the cost function for at least some iterations of the controlling, wherein steps of the method are performed using a processor, and wherein the controlling changes a state of the machine, wherein the cost function includes a stabilization component for directing a movement of the machine to a target state and a performance component for optimizing the movement of the machine until the target state, and wherein the stabilization component includes an estimate of the parameter of the model, wherein the stabilization component includes a sum of stabilization matrices weighted by the estimate of the parameter of the model, and wherein the parameters of the model are subject to bounded uncertainties defining ranges of admissible values of the parameters of the model, wherein values of the ranges of admissible values form a collection of models of the machine, such that the model of the machine is a convex hull of the collection of the models of the machine, further comprising:

determining at least part of the stabilization matrices using a symmetry between values of the extreme models.

2. The method of claim 1, wherein the model of the machine includes $$x(t+1) = \hat{A}x(t) + \hat{B}u(t) = \sum_{i=1}^{l} [\xi(t)]_i (A_i x(t) + B_i u(t)),$$

and the cost function includes $$x(N)'P(\xi(N))x(N) + \sum_{k=0}^{N-1} x(k)'Qx(k) + u(k)'Ru(k),$$

wherein x is the state of the machine, u is the control input, ξ is an uncertain convex combination vector of length l and [ξ]i denotes its $i^{th}$ component, $A_i$, $B_i$, i=1, ..., l are state and input matrices for a collection of models, $\hat{A}$, $\hat{B}$ are estimates of the state and input matrices of the machine model, N is a length of the prediction horizon, Q, R are state and input weight matrices, and P(ξ) is a sum of stabilization matrices dependent on ξ.

3. The method of claim 1, wherein the parameters of the model are subject to bounded uncertainties defining ranges of admissible values of the parameters of the model, wherein values of the ranges of admissible values form a collection of models of the machine, such that the model of the machine is a convex hull of the collection of models of the machine, further comprising:

determining the parameters of the model as weights of the convex hull of the collection of the models of the machine fitting the control inputs and the state of the machine.

4. The method of claim 3, wherein the constraints includes control invariant constraints that ensure satisfaction of specification constraints for the admissible values of the parameters of the model and admissible control inputs to the machine.

5. The method of claim 3, wherein the constraints include a terminal constraint specifying a region for a terminal state at the end of the prediction horizon, further comprising:

determining the terminal constraint using specification constraints, the convex hull of the collection of models and the cost function.

6. The method of claim 5, further comprising:
determining the region of the terminal constraint using a backward reachable method that iteratively determines, starting from a current set of feasible states of the machine, a backward reachable set of the states within the current set that after a one step evolution of dynamics of the machine is inside the current set until the backward reachable set of states of the machine is enclosed by the current set.

7. The method of claim 4, further comprising:
determining a length of the prediction horizon for which there is a solution to the optimization of the cost function for all states satisfying the control invariant constraints; and
determining a length of the prediction horizon as largest between a preferred length of the prediction horizon and the determined length of the prediction horizon, wherein the preferred length of the prediction horizon is a predetermined value.

8. The method of claim 7, wherein the length of prediction horizon is equal to the preferred length the terminal set is computed from stabilizing gains and from specification constraints, and the control invariant set is computed from the terminal set and the prediction horizon having the preferred length.

9. The method of claim 1, wherein the prediction horizon includes a sequence of prediction instants, such that the optimization produces control input for each prediction instant forming a sequence of control inputs for the prediction horizon, wherein the parameters of the model for determining the sequence of the control inputs changes between at least some prediction instants.

10. The method of claim 9, further comprising:
determining, for each prediction instant the model uses the estimate of the parameter of the model determined a number of time instants before the prediction instant to produce a sequence of prediction models for the prediction horizon with different estimations of the parameter; and
jointly determining the sequence of control inputs using the sequence of prediction models.

11. The method of claim 10, wherein the number of time instants is defined by a length of the prediction horizon.

12. The method of claim 1, further comprising:
converting the optimization of the cost function into a quadratic program; and
solving the quadratic program to determine the control inputs.

13. A system for controlling an operation of a machine according to a model of the machine having parameters of a physical structure of the machine, comprising:

a sensor for determining a state of the machine;
a processor for updating a value of at least one parameter of the model using the state of the machine, such that the update value of the parameter satisfies a constraint on admissible values of the parameter; and
a controller for controlling iteratively the operation of the machine with control inputs determined from an optimization of a cost function along a prediction horizon subject to constraints on the control inputs using the model for prediction along the prediction horizon, wherein the cost function includes at least one parameter of the model, such that the updated value of the parameter updates the model and the cost function, wherein the parameter of the model is uncertain due to an uncertainty of a value of a component of the physical structure of the machine represented by the parameter,
wherein the cost function includes a stabilization component for directing a movement of the machine to a target state and a performance component for optimizing the movement of the machine until the target state, and wherein the stabilization component includes a sum of stabilization matrices weighted by estimates of the parameters of the model determined using a symmetry of a convex hull of a collection of models of the machine formed with values of the parameters defined by ranges of admissible values of the parameters of the model.

14. The system of claim 13, wherein parameters of the model are subject to bounded uncertainties defining ranges of admissible values of the parameters of the model, wherein values of the ranges of admissible values form a collection of models of the machine, such that the model of the machine is a convex hull of the collection of models of the machine, wherein the constraints includes control invariant constraints that ensure satisfaction of specification constraints for the admissible values of the parameters of the model and admissible control inputs to the machine, and wherein the constraints include a terminal constraint specifying a region for a terminal state at the end of the prediction horizon, wherein the processor determines the region of the terminal constraint using a backward reachable method that iteratively determines, starting from a current set of feasible states of the machine, a backward reachable set of the states within the current set that after a one step evolution of dynamics of the machine is inside the current set until the backward reachable set of states of the machine is enclosed by the current set.

15. The system of claim 13, wherein the prediction horizon includes a sequence of prediction instants, such that the optimization produces control input for each prediction instant forming a sequence of control inputs for the prediction horizon, wherein estimates of the parameter of the model for determining the sequence of the control inputs changes between at least some prediction instants.

16. The system of claim 15, wherein the number of time instants is defined by a length of the prediction horizon.

* * * * *